US012450983B2

(12) United States Patent
Leggett et al.

(10) Patent No.: US 12,450,983 B2
(45) Date of Patent: Oct. 21, 2025

(54) GAMING SYSTEMS AND METHODS WITH BRANCHING CATALYST EVENTS

(71) Applicant: LNW Gaming, Inc., Las Vegas, NV (US)

(72) Inventors: Sarah Leggett, Chicago, IL (US); Jeremy Hornik, Chicago, IL (US)

(73) Assignee: LNW Gaming, Inc., Las Vegas, NV (US)

( * ) Notice: Subject to any disclaimer, the term of this patent is extended or adjusted under 35 U.S.C. 154(b) by 418 days.

(21) Appl. No.: 18/180,232

(22) Filed: Mar. 8, 2023

(65) Prior Publication Data

US 2024/0304062 A1 Sep. 12, 2024

(51) Int. Cl.
*G07F 17/00* (2006.01)
*G07F 17/32* (2006.01)

(52) U.S. Cl.
CPC ...... *G07F 17/3267* (2013.01); *G07F 17/3211* (2013.01); *G07F 17/3244* (2013.01)

(58) Field of Classification Search
None
See application file for complete search history.

(56) References Cited

U.S. PATENT DOCUMENTS

| | | | |
|---|---|---|---|
| 3,733,075 | A | 5/1973 | Hooker et al. |
| 4,198,052 | A | 4/1980 | Gauselmann |
| 4,732,386 | A | 3/1988 | Rayfiel |
| 5,100,137 | A | 3/1992 | Fulton |
| 5,152,529 | A | 10/1992 | Okada |
| 5,205,555 | A | 4/1993 | Hamano |
| 5,342,047 | A | 8/1994 | Heidel et al. |
| 5,356,140 | A | 10/1994 | Dabrowski et al. |
| 5,393,061 | A | 2/1995 | Manship et al. |
| 5,395,111 | A | 3/1995 | Inoue |
| 5,431,408 | A | 7/1995 | Adams |
| 5,511,781 | A | 4/1996 | Wood et al. |
| 5,618,232 | A | 4/1997 | Martin |
| 5,695,188 | A | 12/1997 | Ishibashi |
| 5,704,835 | A | 1/1998 | Dietz |

(Continued)

FOREIGN PATENT DOCUMENTS

| | | | |
|---|---|---|---|
| AU | 2013251288 | A1 | 5/2014 |
| AU | 2014202042 | A1 | 5/2014 |

(Continued)

*Primary Examiner* — Paul A D'Agostino

(57) ABSTRACT

A gaming system and methods thereof that utilize game-logic circuitry and a presentation assembly that presents a plurality of symbol positions, one or more persistent elements respectively associated with one or more bonus game features, and one or more game outcomes by populating the symbol positions with a respective set of symbols. In response to detecting a catalyst event including a feature-triggering symbol within any of the outcomes, the presentation assembly animates an addition of the feature-triggering symbol to a first persistent element, presents, in response to randomly selecting a first outcome state of the catalyst event, one or more bonus game outcomes based on the bonus game features linked to the first persistent element, and presents, in response to randomly selecting a second outcome state of the catalyst event, an award sequence for an award including an award value visually indicated by the feature-trigger symbol.

23 Claims, 9 Drawing Sheets

(56) References Cited

U.S. PATENT DOCUMENTS 5,722,891 A 3/1998 Inoue
5,752,881 A 5/1998 Inoue
5,766,074 A 6/1998 Cannon et al.
5,788,573 A 8/1998 Baerlocher et al.
5,807,177 A 9/1998 Takemoto et al.
5,810,665 A 9/1998 Takemoto et al.
5,833,537 A * 11/1998 Barrie ................. G07F 17/3265 D21/370
5,848,932 A 12/1998 Adams
5,855,515 A 1/1999 Pease et al.
5,876,284 A 3/1999 Acres et al.
5,882,259 A 3/1999 Holmes, Jr. et al.
5,882,261 A 3/1999 Adams
5,890,962 A 4/1999 Takemoto
5,911,418 A 6/1999 Adams
5,947,820 A 9/1999 Morro et al.
5,951,397 A 9/1999 Dickinson
5,988,638 A 11/1999 Rodesch et al.
6,004,207 A 12/1999 Wilson, Jr. et al.
6,027,115 A 2/2000 Griswold et al.
6,033,307 A 3/2000 Vancura
6,048,269 A 4/2000 Burns et al.
6,050,895 A 4/2000 Luciano, Jr. et al.
6,056,642 A 5/2000 Bennett
6,089,976 A 7/2000 Schneider et al.
6,089,977 A 7/2000 Bennett
6,102,798 A 8/2000 Bennett
6,120,031 A 9/2000 Adams
6,142,873 A 11/2000 Weiss et al.
6,159,097 A 12/2000 Gura
6,162,121 A 12/2000 Morro et al.
6,168,520 B1 1/2001 Baerlocher et al.
6,186,894 B1 2/2001 Mayeroff
6,203,429 B1 3/2001 Demar et al.
6,213,875 B1 4/2001 Suzuki
6,224,482 B1 5/2001 Bennett
6,224,483 B1 5/2001 Mayeroff
6,224,484 B1 5/2001 Okuda et al.
6,227,971 B1 5/2001 Weiss
6,241,607 B1 6/2001 Payne et al.
6,251,013 B1 6/2001 Bennett
6,270,411 B1 8/2001 Gura et al.
6,270,412 B1 8/2001 Crawford et al.
6,290,600 B1 9/2001 Glasson
6,309,300 B1 10/2001 Glavich
6,319,124 B1 11/2001 Baerlocher et al.
6,346,043 B1 2/2002 Colin et al.
6,364,766 B1 4/2002 Anderson et al.
6,375,567 B1 4/2002 Acres
6,375,570 B1 4/2002 Poole
6,413,162 B1 7/2002 Baerlocher et al.
6,481,713 B2 11/2002 Perrie et al.
6,517,432 B1 2/2003 Jaffe
6,537,150 B1 3/2003 Luciano et al.
6,544,120 B2 4/2003 Ainsworth
6,547,242 B1 4/2003 Sugiyama et al.
6,551,187 B1 4/2003 Jaffe
6,554,704 B2 4/2003 Nicastro et al.
6,558,254 B2 5/2003 Baelocher et al.
6,561,900 B1 5/2003 Baerlocher et al.
6,561,904 B2 5/2003 Locke et al.
6,565,434 B1 5/2003 Acres
6,641,477 B1 11/2003 Dietz
6,652,378 B2 11/2003 Cannon et al.
6,656,040 B1 12/2003 Brosnan et al.
6,657,923 B2 12/2003 Laughlin
6,692,356 B2 2/2004 Baerlocher et al.
6,702,675 B2 3/2004 Poole et al.
6,731,313 B1 5/2004 Kaminkow
6,749,502 B2 6/2004 Baerlocher
6,786,818 B1 9/2004 Rothschild et al.
6,832,957 B2 12/2004 Falconer
6,837,790 B1 1/2005 Kaminkow
6,855,053 B2 2/2005 Baerlocher
6,869,360 B2 3/2005 Marks et al.
6,878,061 B2 4/2005 Baerlocher et al.
6,896,617 B2 5/2005 Daly
6,910,962 B2 6/2005 Marks et al.
6,916,243 B2 7/2005 Yoshida
6,918,834 B2 7/2005 Vancura
6,921,334 B1 7/2005 Bennett
6,926,609 B2 8/2005 Martin
6,960,134 B2 11/2005 Hartl et al.
6,964,416 B2 11/2005 Mcclintic et al.
7,018,293 B2 3/2006 Brown et al.
7,029,395 B1 4/2006 Baerlocher
7,029,396 B2 4/2006 Jaffe et al.
7,065,215 B2 6/2006 Shirakawa et al.
7,112,136 B2 9/2006 Anderson et al.
7,121,945 B2 10/2006 Suganuma et al.
7,137,886 B2 11/2006 Locke et al.
7,147,559 B2 12/2006 Englman
7,156,740 B2 1/2007 Kaminkow
7,179,169 B2 2/2007 Beaulieu et al.
7,252,591 B2 8/2007 Van Asdale
7,294,055 B2 11/2007 Baerlocher et al.
7,316,613 B2 1/2008 Luccesi et al.
7,371,170 B2 5/2008 Cregan et al.
7,377,850 B2 5/2008 Shackelford et al.
7,431,646 B2 10/2008 Jackson
7,452,276 B2 11/2008 Loose et al.
7,458,890 B2 12/2008 Loose et al.
7,488,252 B2 2/2009 Griswold et al.
7,494,412 B2 2/2009 Baerlocher
7,503,847 B2 3/2009 Baerlocher
7,526,736 B2 4/2009 Kaminkow et al.
7,553,231 B2 6/2009 Rodgers et al.
7,578,735 B2 8/2009 Frizzell et al.
7,601,062 B2 10/2009 Cole et al.
7,604,538 B2 10/2009 Pacey
7,618,319 B2 11/2009 Casey et al.
7,625,278 B2 12/2009 Paulsen et al.
7,628,690 B2 12/2009 Englman et al.
7,631,872 B2 12/2009 Roemer et al.
7,654,895 B2 2/2010 Pacey
7,654,899 B2 2/2010 Durham et al.
7,699,699 B2 4/2010 Gilliland et al.
7,704,141 B1 4/2010 Marks et al.
7,744,460 B2 6/2010 Walker et al.
7,785,191 B2 8/2010 Marks et al.
7,789,744 B2 9/2010 Fiden
7,841,934 B2 11/2010 Gauselmann
7,980,936 B2 7/2011 Mead
8,021,223 B2 9/2011 Rose
8,021,225 B2 9/2011 Okada
8,066,563 B1 11/2011 Schultz et al.
8,083,581 B2 12/2011 Marks et al.
8,105,145 B2 1/2012 Jaffe
8,105,151 B2 1/2012 Caputo et al.
8,113,940 B2 2/2012 Hornik
8,118,666 B2 * 2/2012 Nicely ................ G07F 17/3244 463/16
8,147,322 B2 4/2012 Walker et al.
8,162,740 B2 4/2012 Aoki
8,162,741 B2 4/2012 Wadleigh et al.
8,192,275 B2 6/2012 Aoki et al.
8,246,442 B1 8/2012 Barrie
8,272,938 B2 9/2012 Gilmore et al.
8,287,357 B2 10/2012 Evans
8,298,070 B2 * 10/2012 Kato .................. G07F 17/3267 463/20
8,323,091 B2 12/2012 Frank et al.
8,357,041 B1 1/2013 Saunders
8,360,851 B2 * 1/2013 Aoki .................. G07F 17/3258 463/20
8,366,538 B1 2/2013 Saunders et al.
8,371,930 B1 2/2013 Saunders et al.
8,388,432 B2 3/2013 Mattice et al.
8,414,380 B2 4/2013 Saunders et al.
8,444,473 B2 * 5/2013 Ching ................. G07F 17/3267 463/43
8,465,358 B2 6/2013 Kemper
8,480,473 B2 7/2013 Villejo et al.
8,496,522 B2 7/2013 Caputo et al.

(56) References Cited

U.S. PATENT DOCUMENTS 8,512,121 B2 8/2013 Macvittie et al.
8,512,124 B2 8/2013 Bramble et al.
8,512,138 B2 8/2013 Saunders
8,523,659 B2 9/2013 Evans
8,574,059 B2 11/2013 Rodgers et al.
8,602,868 B2 12/2013 Johnson et al.
8,608,545 B2 12/2013 Arora et al.
8,662,986 B2 3/2014 Rodgers et al.
8,678,908 B2 3/2014 Nicely
8,690,660 B2 4/2014 Saunders et al.
8,696,434 B2 4/2014 Tsukahara
8,702,487 B2 4/2014 Thomas
8,771,054 B2 * 7/2014 Aoki .................. G07F 17/3267 463/20
8,790,169 B2 7/2014 Saunders
8,795,059 B2 8/2014 Aoki et al.
8,821,254 B2 9/2014 Tsukahara
8,834,258 B2 9/2014 Gobe et al.
8,851,974 B2 10/2014 Caputo et al.
8,870,642 B2 10/2014 Leupp et al.
8,882,578 B2 11/2014 Saunders
8,961,291 B2 2/2015 Dias Pires et al.
9,005,022 B2 4/2015 Saunders
9,011,233 B2 4/2015 Ryan
9,098,847 B2 8/2015 Basallo et al.
9,098,973 B2 8/2015 Basallo et al.
9,147,321 B2 9/2015 Moody
9,165,433 B2 10/2015 Caputo
9,177,447 B2 11/2015 Zoltewicz et al.
9,202,337 B2 * 12/2015 Lee ..................... G07F 17/3258
9,202,345 B2 12/2015 Zoltewicz et al.
9,214,011 B2 12/2015 Wei et al.
9,230,410 B2 1/2016 Saunders et al.
9,245,421 B2 1/2016 Saunders et al.
9,251,667 B2 2/2016 Marks et al.
9,257,017 B2 2/2016 Saunders et al.
9,262,895 B2 2/2016 Rodgers et al.
9,275,524 B2 3/2016 Nicely
9,299,224 B2 3/2016 Leupp
9,311,781 B2 4/2016 Edwards
9,349,251 B2 5/2016 Caputo et al.
9,355,528 B2 5/2016 Nicely
9,418,521 B1 * 8/2016 Henrick .............. G07F 17/3244
9,424,720 B2 8/2016 Suda
9,430,900 B2 8/2016 Zoltewicz et al.
9,466,169 B2 10/2016 Basallo et al.
9,474,972 B2 10/2016 Lenger
9,495,839 B2 11/2016 Aoki et al.
9,595,157 B2 3/2017 Rasmussen et al.
9,633,506 B2 4/2017 Basallo et al.
9,704,342 B2 7/2017 Aoki et al.
9,928,691 B2 3/2018 Olive
10,013,855 B2 7/2018 Nakamura
10,037,651 B2 7/2018 You et al.
10,043,350 B2 8/2018 Gomez et al.
10,062,237 B2 8/2018 Devine et al.
10,204,473 B2 2/2019 Lenger
10,242,533 B2 3/2019 Okada et al.
10,262,501 B2 * 4/2019 Satterlie .............. G07F 17/3267
10,339,761 B2 7/2019 Olive
10,366,575 B2 7/2019 Visser
10,388,112 B2 8/2019 You et al.
10,410,472 B2 9/2019 Moody
10,417,877 B2 9/2019 Gomez et al.
10,475,294 B2 11/2019 Gomez et al.
10,497,203 B2 12/2019 Elmqvist
10,672,220 B2 6/2020 Lenger
10,706,664 B2 7/2020 Boese et al.
10,726,676 B2 7/2020 You et al.
10,769,888 B2 9/2020 You et al.
10,818,145 B2 * 10/2020 Kendall .................. G07F 17/34
10,839,648 B2 11/2020 Okada et al.
10,957,161 B2 3/2021 Chesworth et al.
11,017,638 B2 5/2021 Chesworth et al.
11,475,735 B2 * 10/2022 Visser ................. G07F 17/3213
11,551,527 B2 * 1/2023 Cohn .................. G07F 17/3267
11,990,007 B2 * 5/2024 Marks ...................... G07F 17/34
12,046,101 B2 * 7/2024 Uberuaga ............... G07F 17/34
2001/0021666 A1 9/2001 Yoshida et al.
2002/0016200 A1 2/2002 Baerlocher et al.
2002/0045474 A1 4/2002 Singer et al.
2002/0119818 A1 8/2002 Savio et al.
2002/0155881 A1 10/2002 Yoshida
2002/0183105 A1 12/2002 Cannon et al.
2003/0017865 A1 1/2003 Beaulieu et al.
2003/0027619 A1 2/2003 Nicastro, Sr.
2003/0035346 A1 2/2003 Laughlin
2003/0064782 A1 4/2003 Beaulieu et al.
2003/0064801 A1 4/2003 Breckner et al.
2003/0064802 A1 4/2003 Rodgers et al.
2003/0069063 A1 4/2003 Bilyeu et al.
2003/0130034 A1 7/2003 Suganuma et al.
2003/0157980 A1 8/2003 Loose et al.
2003/0216165 A1 11/2003 Singer et al.
2004/0012145 A1 1/2004 Inoue
2004/0023714 A1 2/2004 Asdale
2004/0043815 A1 3/2004 Kaminkow
2004/0048646 A1 3/2004 Visocnik
2004/0092315 A1 5/2004 Boyd et al.
2004/0137982 A1 7/2004 Cuddy et al.
2004/0171417 A1 9/2004 Beaulieu et al.
2004/0198489 A1 10/2004 Kaminkow et al.
2005/0054442 A1 3/2005 Anderson et al.
2005/0075163 A1 * 4/2005 Cuddy ................ G07F 17/3267 463/20
2005/0130731 A1 6/2005 Englman et al.
2005/0159208 A1 7/2005 Pacey
2006/0009286 A1 1/2006 Durham et al.
2006/0063588 A1 3/2006 Poole
2006/0111173 A1 5/2006 Yang
2006/0142080 A1 6/2006 Enzminger
2006/0178202 A1 * 8/2006 Hughes ................... G07F 17/32 463/20
2006/0189369 A1 8/2006 Taylor
2006/0205469 A1 9/2006 Schultz et al.
2006/0247002 A1 11/2006 Yoshimi et al.
2007/0060248 A1 3/2007 Rodgers et al.
2007/0060255 A1 3/2007 Baerlocher et al.
2007/0060275 A1 3/2007 Gilmore et al.
2007/0129135 A1 6/2007 Marks et al.
2007/0149267 A1 6/2007 Ross et al.
2007/0213114 A1 * 9/2007 Caspers .............. G07F 17/3244 463/16
2007/0281784 A1 12/2007 Seelig et al.
2007/0287529 A1 12/2007 Kojima
2008/0003278 A1 1/2008 Mondelo
2008/0004532 A1 1/2008 Rubey et al.
2008/0032784 A1 2/2008 Englman
2008/0045298 A1 2/2008 Yoshizawa
2008/0045320 A1 2/2008 Kato
2008/0108408 A1 5/2008 Wolf
2008/0108411 A1 5/2008 Jensen et al.
2008/0108422 A1 5/2008 Hedrick et al.
2008/0108431 A1 5/2008 Cuddy et al.
2008/0132321 A1 6/2008 Pau
2008/0182647 A1 7/2008 Brunet De Courssou et al.
2008/0274789 A1 11/2008 Singer et al.
2009/0036208 A1 2/2009 Pennington et al.
2009/0104986 A1 * 4/2009 Englman ............. G07F 17/3258 463/27
2009/0131145 A1 * 5/2009 Aoki ................... G07F 17/3244 463/20
2009/0156287 A1 6/2009 Baumgartner
2009/0181755 A1 7/2009 Gagner et al.
2009/0239634 A1 9/2009 Nguyen
2009/0291741 A1 11/2009 Schofield
2010/0075737 A1 3/2010 Bluemel
2010/0113133 A1 5/2010 Leupp
2010/0113146 A1 * 5/2010 Hedrick .............. G07F 17/3267 463/36
2010/0167815 A1 7/2010 Gagner et al.
2010/0203948 A1 8/2010 Falciglia, Sr.
2010/0210343 A1 8/2010 Englman et al.
2010/0234092 A1 9/2010 Gomez et al.

(56) References Cited

U.S. PATENT DOCUMENTS

| | | | |
|---|---|---|---|
| 2010/0304832 | A1 | 12/2010 | Kup-Ferroth |
| 2011/0244943 | A1 | 10/2011 | Milford et al. |
| 2011/0300937 | A1 | 12/2011 | Crowder, Jr. et al. |
| 2012/0015707 | A1 | 1/2012 | Hornik et al. |
| 2012/0034965 | A1 | 2/2012 | Masen et al. |
| 2012/0077564 | A1 | 3/2012 | Collette et al. |
| 2012/0094738 | A1* | 4/2012 | Aoki .................. G07F 17/3258 463/20 |
| 2012/0122532 | A1 | 5/2012 | Berman et al. |
| 2012/0178517 | A1 | 7/2012 | Montenegro et al. |
| 2012/0220360 | A1 | 8/2012 | McAllister et al. |
| 2012/0289326 | A1* | 11/2012 | Englman ................ G07F 17/32 463/27 |
| 2013/0053124 | A1 | 2/2013 | Masen et al. |
| 2013/0065663 | A1 | 3/2013 | Johnson et al. |
| 2013/0102375 | A1 | 4/2013 | Aoki et al. |
| 2013/0252704 | A1 | 9/2013 | Gilbertson et al. |
| 2013/0260861 | A1 | 10/2013 | Vann et al. |
| 2013/0273997 | A1* | 10/2013 | Stewart ............... G07F 17/3244 463/20 |
| 2013/0324217 | A1 | 12/2013 | Gilbertson et al. |
| 2014/0014186 | A1 | 1/2014 | Bhattacharya et al. |
| 2014/0024429 | A1 | 1/2014 | Aoki et al. |
| 2014/0051496 | A1 | 2/2014 | Meyer |
| 2014/0141860 | A1 | 5/2014 | Meyer |
| 2014/0179396 | A1 | 6/2014 | Aoki et al. |
| 2014/0274292 | A1 | 9/2014 | Suda |
| 2014/0274348 | A1* | 9/2014 | Baerlocher ......... G07F 17/3267 463/26 |
| 2014/0323198 | A1 | 10/2014 | Tuck |
| 2015/0031437 | A1 | 1/2015 | Gomez et al. |
| 2015/0170462 | A1 | 6/2015 | Berman et al. |
| 2015/0206386 | A1 | 7/2015 | Jaffe et al. |
| 2015/0269809 | A1 | 9/2015 | Smith |
| 2015/0287269 | A1 | 10/2015 | Berman |
| 2015/0356833 | A1 | 12/2015 | Aoki et al. |
| 2015/0379831 | A1 | 12/2015 | Lee et al. |
| 2016/0042597 | A1 | 2/2016 | Olive |
| 2016/0155303 | A1 | 6/2016 | Aoki et al. |
| 2017/0092066 | A1* | 3/2017 | Watkins .................. G07F 17/34 |
| 2017/0154498 | A1* | 6/2017 | Olive ...................... G07F 17/34 |
| 2017/0309119 | A1* | 10/2017 | San ......................... G07F 17/34 |
| 2017/0372558 | A1 | 12/2017 | You et al. |
| 2018/0130303 | A1 | 5/2018 | Lamb |
| 2018/0268655 | A1 | 9/2018 | Olive |
| 2018/0268659 | A1* | 9/2018 | Chesworth .......... G07F 17/3267 |
| 2019/0051097 | A1 | 2/2019 | Marks et al. |
| 2019/0102992 | A1 | 4/2019 | You et al. |
| 2019/0236905 | A1 | 8/2019 | Washington et al. |
| 2019/0355218 | A1* | 11/2019 | Visser ................. G07F 17/3213 |
| 2020/0074814 | A1* | 3/2020 | Marks ..................... G07F 17/34 |
| 2023/0018779 | A1* | 1/2023 | Xu ...................... G07F 17/3262 |
| 2023/0177911 | A1* | 6/2023 | Milosevich ........... G07F 17/326 463/31 |
| 2023/0351841 | A1* | 11/2023 | Jackson .................. G07F 17/34 |

FOREIGN PATENT DOCUMENTS

| | | | |
|---|---|---|---|
| AU | 2015210489 | A1 | 2/2016 |
| GB | 2097160 | A | 10/1982 |
| GB | 2097160 | B | 5/1984 |
| GB | 2144568 | A | 3/1985 |
| GB | 2144568 | B | 9/1985 |
| GB | 2251112 | A | 6/1992 |

* cited by examiner

GAMING SYSTEMS AND METHODS WITH BRANCHING CATALYST EVENTS

COPYRIGHT

A portion of the disclosure of this patent document contains material which is subject to copyright protection. The copyright owner has no objection to the facsimile reproduction by anyone of the patent disclosure, as it appears in the Patent and Trademark Office patent files or records, but otherwise reserves all copyright rights whatsoever. Copyright 2023, LNW Gaming, Inc.

FIELD OF THE INVENTION

The present invention relates to a technological improvement to gaming systems, gaming machines, and methods and, more particularly, to technological improvements in connection with a spin-hold-match feature.

BACKGROUND OF THE INVENTION

The gaming industry depends upon player participation. Players are generally "hopeful" players who either think they are lucky or at least think they can get lucky—for a relatively small investment to play a game, they can get a disproportionately large return. To create this feeling of luck, a gaming apparatus relies upon an internal or external random element generator to generate one or more random elements such as random numbers. The gaming apparatus determines a game outcome based, at least in part, on the one or more random elements.

A significant technical challenge is to improve the operation of gaming apparatus and games played thereon, including the manner in which they leverage the underlying random element generator, by making them yield a negative return on investment in the long run (via a high quantity and/or frequency of player/apparatus interactions) and yet random and volatile enough to make players feel they can get lucky and win in the short run. Striking the right balance between yield versus randomness and volatility to create a feeling of luck involves addressing many technical problems, some of which can be at odds with one another. This luck factor is what appeals to core players and encourages prolonged and frequent player participation. As the industry matures, the creativity and ingenuity required to improve such operation of gaming apparatus and games grows accordingly.

Another significant technical challenge is to improve the operation of gaming apparatus and games played thereon by increasing processing speed and efficiency of usage of processing and/or memory resources. To make games more entertaining and exciting, they often offer the complexities of advanced graphics and special effects, multiple game features with different game formats, and multiple random outcome determinations per feature. The game formats may, for example, include picking games, reel spins, wheel spins, and other arcade-style play mechanics. Inefficiencies in processor execution of the game software can slow down play of the game and prevent a player from playing the game at their desired pace.

Yet another significant technical challenge is to provide a new and improved level of game play that uses new and improved gaming apparatus animations. Improved animations represent improvements to the underlying technology or technical field of gaming apparatus and, at the same time, have the effect of encouraging prolonged and frequent player participation.

SUMMARY OF THE INVENTION

According to embodiments of the present invention, there are provided gaming systems and methods thereof that utilize game-logic circuitry and a presentation assembly that presents a plurality of symbol positions, one or more persistent elements respectively associated with one or more bonus game features, and one or more game outcomes by populating the symbol positions with a respective set of symbols. In response to detecting a catalyst event including a feature-triggering symbol within any of the outcomes, the presentation assembly animates an addition of the feature-triggering symbol to a first persistent element, presents, in response to randomly selecting a first outcome state of the catalyst event, one or more bonus game outcomes based on the bonus game features linked to the first persistent element, and presents, in response to randomly selecting a second outcome state of the catalyst event, an award sequence for an award including an award value visually indicated by the feature-trigger symbol. The systems may be partially or wholly integrated within a free-standing gaming machine as described herein.

Additional aspects of the invention will be apparent to those of ordinary skill in the art in view of the detailed description of various embodiments, which is made with reference to the drawings, a brief description of which is provided below.

BRIEF DESCRIPTION OF THE DRAWINGS

FIG. 3A relates to a base-game portion of a wagering game; FIG. 3B relates to a game feature that may be triggered during play of the base game.

Figure 1:
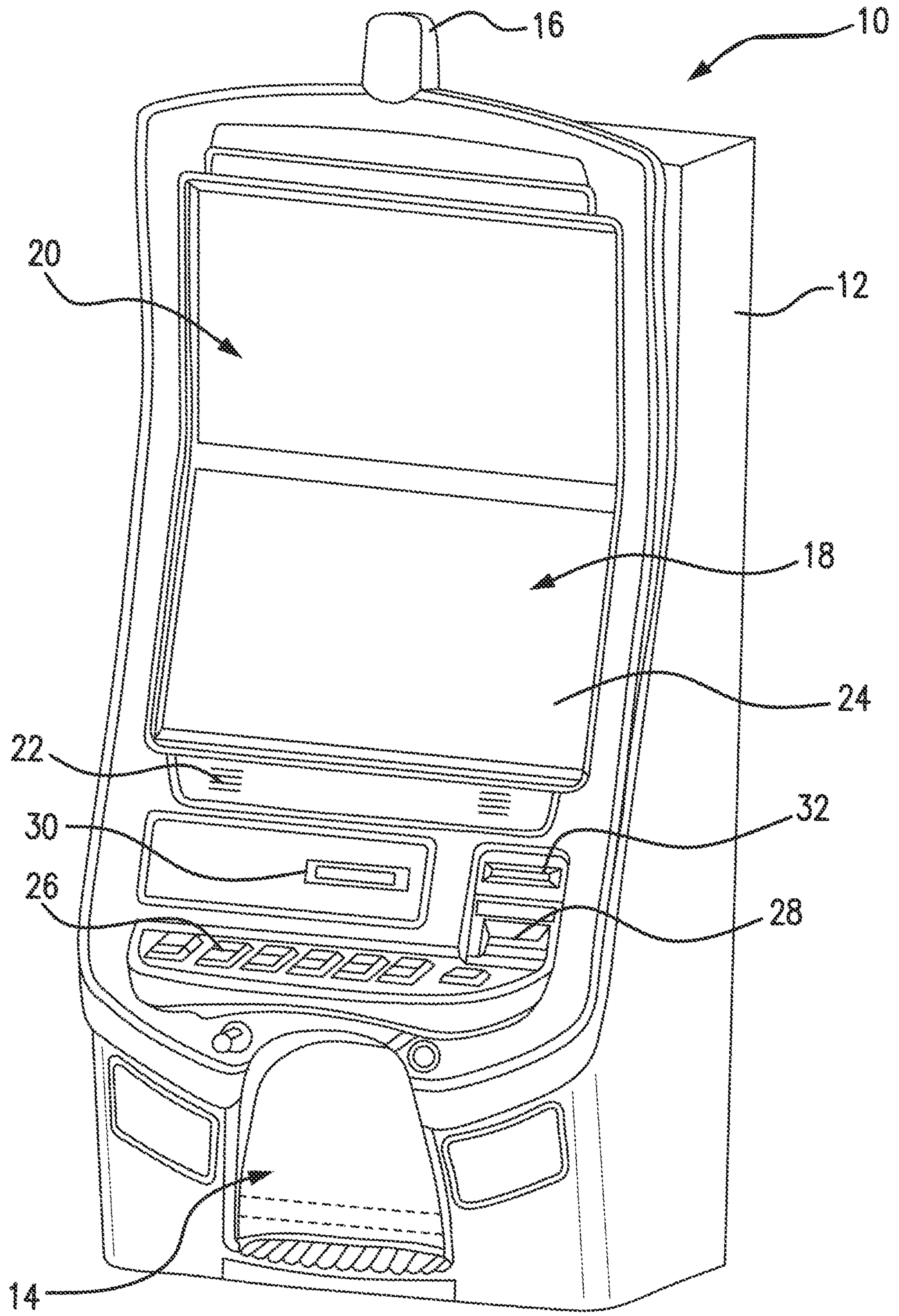
FIG. 1 is a front view of a free-standing gaming machine according to an embodiment of the present invention.

While the invention is susceptible to various modifications and alternative forms, specific embodiments have been shown by way of example in the drawings and will be described in detail herein. It should be understood, however, that the invention is not intended to be limited to the particular forms disclosed. Rather, the invention is to cover all modifications, equivalents, and alternatives falling within the spirit and scope of the invention as defined by the appended claims.

DETAILED DESCRIPTION

While this invention is susceptible of embodiment in many different forms, there is shown in the drawings and will herein be described in detail preferred embodiments of the invention with the understanding that the present disclosure is to be considered as an exemplification of the principles of the invention and is not intended to limit the broad aspect of the invention to the embodiments illustrated. For purposes of the present detailed description, the singular includes the plural and vice versa (unless specifically disclaimed); the words "and" and "or" shall be both conjunctive and disjunctive; the word "all" means "any and all"; the word "any" means "any and all"; and the word "including" means "including without limitation."

For purposes of the present detailed description, the terms "wagering game," "casino wagering game," "gambling," "slot game," "casino game," and the like include games in which a player places at risk a sum of money or other representation of value, whether or not redeemable for cash, on an event with an uncertain outcome, including without limitation those having some element of skill. In some embodiments, the wagering game involves wagers of real money, as found with typical land-based or online casino games. In other embodiments, the wagering game additionally, or alternatively, involves wagers of non-cash values, such as virtual currency, and therefore may be considered a social or casual game, such as would be typically available on a social networking web site, other web sites, across computer networks, or applications on mobile devices (e.g., phones, tablets, etc.). When provided in a social or casual game format, the wagering game may closely resemble a traditional casino game, or it may take another form that more closely resembles other types of social/casual games.

Referring to FIG. 1, there is shown a gaming machine 10 similar to those operated in gaming establishments, such as casinos. With regard to the present invention, the gaming machine 10 may be any type of gaming terminal or machine and may have varying structures and methods of operation. For example, in some aspects, the gaming machine 10 is an electromechanical gaming terminal configured to play mechanical slots, whereas in other aspects, the gaming machine is an electronic gaming terminal configured to play a video casino game, such as slots, keno, poker, blackjack, roulette, craps, etc. The gaming machine 10 may take any suitable form, such as floor-standing models as shown, handheld mobile units, bartop models, workstation-type console models, etc. Further, the gaming machine 10 may be primarily dedicated for use in playing wagering games, or may include non-dedicated devices, such as mobile phones, personal digital assistants, personal computers, etc. Exemplary types of gaming machines are disclosed in U.S. Pat. Nos. 6,517,433, 8,057,303, and 8,226,459, which are incorporated herein by reference in their entireties.

The gaming machine 10 illustrated in FIG. 1 comprises a gaming cabinet 12 that securely houses various input devices, output devices, input/output devices, internal electronic/electromechanical components, and wiring. The cabinet 12 includes exterior walls, interior walls, and shelves for mounting the internal components and managing the wiring, and one or more front doors that are locked and require a physical or electronic key to gain access to the interior compartment of the cabinet 12 behind the locked door. The cabinet 12 forms an alcove 14 configured to store one or more beverages or personal items of a player. A notification mechanism 16, such as a candle or tower light, is mounted to the top of the cabinet 12. It flashes to alert an attendant that change is needed, a hand pay is requested, or there is a potential problem with the gaming machine 10.

The input devices, output devices, and input/output devices are disposed on, and securely coupled to, the cabinet 12. By way of example, the output devices include a primary presentation device 18, a secondary presentation device 20, and one or more audio speakers 22. The primary presentation device 18 or the secondary presentation device 20 may be a mechanical-reel display device, a video display device, or a combination thereof. In one such combination disclosed in U.S. Pat. No. 6,517,433, a transmissive video display is disposed in front of the mechanical reel display to portray a video image superimposed upon electro-mechanical reels. In another combination disclosed in U.S. Pat. No. 7,654,899, a projector projects video images onto stationary or moving surfaces. In yet another combination disclosed in U.S. Pat. No. 7,452,276, miniature video displays are mounted to electro-mechanical reels and portray video symbols for the game. In a further combination disclosed in U.S. Pat. No. 8,591,330, flexible displays such as OLED or e-paper displays are affixed to electro-mechanical reels. The aforementioned U.S. Pat. Nos. 6,517,433, 7,654,899, 7,452,276, and 8,591,330 are incorporated herein by reference in their entireties.

The presentation devices 18, 20, the audio speakers 22, lighting assemblies, and/or other devices associated with presentation are collectively referred to as a "presentation assembly" of the gaming machine 10. The presentation assembly may include one presentation device (e.g., the primary presentation device 18), some of the presentation devices of the gaming machine 10, or all of the presentation devices of the gaming machine 10. The presentation assembly may be configured to present a unified presentation sequence formed by visual, audio, tactile, and/or other suitable presentation means, or the devices of the presentation assembly may be configured to present respective presentation sequences or respective information.

The presentation assembly, and more particularly the primary presentation device 18 and/or the secondary presentation device 20, variously presents information associated with wagering games, non-wagering games, community games, progressives, advertisements, services, premium entertainment, text messaging, emails, alerts, announcements, broadcast information, subscription information, etc. appropriate to the particular mode(s) of operation of the gaming machine 10. The gaming machine 10 may include a touch screen(s) 24 mounted over the primary or secondary presentation devices, buttons 26 on a button panel, a bill/ticket acceptor 28, a card reader/writer 30, a ticket dispenser 32, and player-accessible ports (e.g., audio output jack for headphones, video headset jack, USB port, wireless transmitter/receiver, etc.). It should be understood that numerous other peripheral devices and other elements exist and are readily utilizable in any number of combinations to create various forms of a gaming machine in accord with the present concepts.

The player input devices, such as the touch screen 24, buttons 26, a mouse, a joystick, a gesture-sensing device, a voice-recognition device, and a virtual-input device, accept player inputs and transform the player inputs to electronic data signals indicative of the player inputs, which correspond to an enabled feature for such inputs at a time of activation (e.g., pressing a "Max Bet" button or soft key to indicate a player's desire to place a maximum wager to play the wagering game). The inputs, once transformed into electronic data signals, are output to game-logic circuitry for processing. The electronic data signals are selected from a group consisting essentially of an electrical current, an electrical voltage, an electrical charge, an optical signal, an optical element, a magnetic signal, and a magnetic element.

The gaming machine 10 includes one or more value input/payment devices and value output/payout devices. In order to deposit cash or credits onto the gaming machine 10, the value input devices are configured to detect a physical item associated with a monetary value that establishes a credit balance on a credit meter such as the "credits" meter 200 (see FIG. 4). The physical item may, for example, be currency bills, coins, tickets, vouchers, coupons, cards, and/or computer-readable storage mediums. The deposited cash or credits are used to fund wagers placed on the wagering game played via the gaming machine 10. Examples of value input devices include, but are not limited to, a coin acceptor, the bill/ticket acceptor 28, the card reader/writer 30, a wireless communication interface for reading cash or credit data from a nearby mobile device, and a network interface for withdrawing cash or credits from a remote account via an electronic funds transfer. In response to a cashout input that initiates a payout from the credit balance on the "credits" meter 200 (see FIG. 4), the value output devices are used to dispense cash or credits from the gaming machine 10. The credits may be exchanged for cash at, for example, a cashier or redemption station. Examples of value output devices include, but are not limited to, a coin hopper for dispensing coins or tokens, a bill dispenser, the card reader/writer 30, the ticket dispenser 32 for printing tickets redeemable for cash or credits, a wireless communication interface for transmitting cash or credit data to a nearby mobile device, and a network interface for depositing cash or credits to a remote account via an electronic funds transfer.

Figure 2:
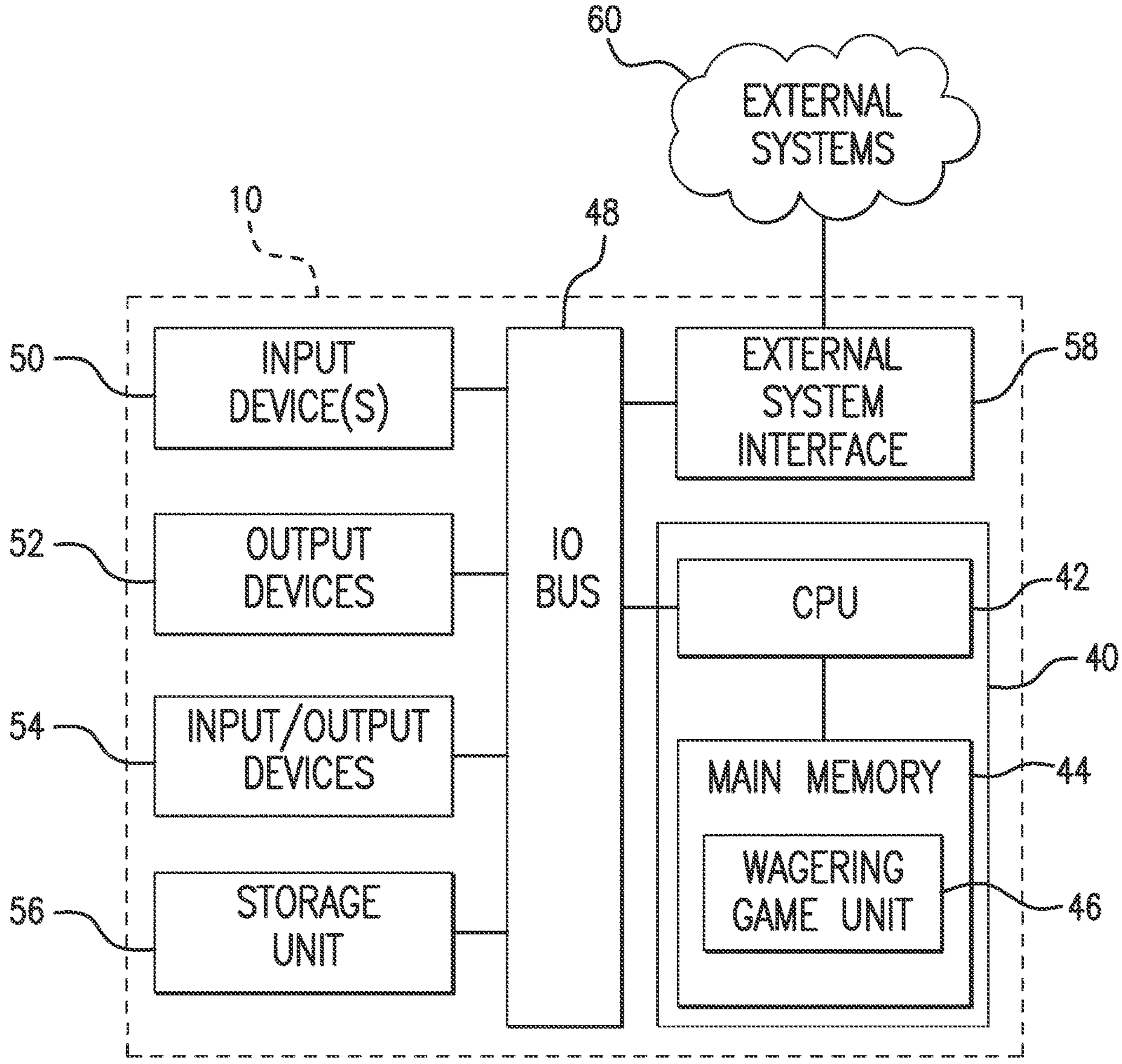
FIG. 2 is a block diagram of a gaming system according to an embodiment of the present invention.

Turning now to FIG. 2, there is shown a block diagram of the gaming-machine architecture. The gaming machine 10 includes game-logic circuitry 40 securely housed within a locked box inside the gaming cabinet 12 (see FIG. 1). The game-logic circuitry 40 includes a central processing unit (CPU) 42 connected to a main memory 44 that comprises one or more memory devices. The CPU 42 includes any suitable processor(s), such as those made by Intel and AMD. By way of example, the CPU 42 includes a plurality of microprocessors including a master processor, a slave processor, and a secondary or parallel processor. Game-logic circuitry 40, as used herein, comprises any combination of hardware, software, or firmware disposed in or outside of the gaming machine 10 that is configured to communicate with or control the transfer of data between the gaming machine 10 and a bus, another computer, processor, device, service, or network. The game-logic circuitry 40, and more specifically the CPU 42, comprises one or more controllers or processors and such one or more controllers or processors need not be disposed proximal to one another and may be located in different devices or in different locations. The game-logic circuitry 40, and more specifically the main memory 44, comprises one or more memory devices which need not be disposed proximal to one another and may be located in different devices or in different locations. The game-logic circuitry 40 is operable to execute all of the various gaming methods and other processes disclosed herein. The main memory 44 includes a wagering-game unit 46. In one embodiment, the wagering-game unit 46 causes wagering games to be presented, such as video poker, video blackjack, video slots, video lottery, etc., in whole or part.

The game-logic circuitry 40 is also connected to an input/output (I/O) bus 48, which can include any suitable bus technologies, such as an AGTL+ frontside bus and a PCI backside bus. The I/O bus 48 is connected to various input devices 50, output devices 52, and input/output devices 54 such as those discussed above in connection with FIG. 1. The I/O bus 48 is also connected to a storage unit 56 and an external-system interface 58, which is connected to external system(s) 60 (e.g., wagering-game networks).

The external system 60 includes, in various aspects, a gaming network, other gaming machines or terminals, a gaming server, a remote controller, communications hardware, or a variety of other interfaced systems or components, in any combination. In yet other aspects, the external system 60 comprises a player's portable electronic device (e.g., cellular phone, electronic wallet, etc.) and the external-system interface 58 is configured to facilitate wireless communication and data transfer between the portable electronic device and the gaming machine 10, such as by a near-field communication path operating via magnetic-field induction or a frequency-hopping spread spectrum RF signals (e.g., Bluetooth, etc.).

The gaming machine 10 optionally communicates with the external system 60 such that the gaming machine 10 operates as a thin, thick, or intermediate client. The game-logic circuitry 40—whether located within ("thick client"), external to ("thin client"), or distributed both within and external to ("intermediate client") the gaming machine 10—is utilized to provide a wagering game on the gaming machine 10. In general, the main memory 44 stores programming for a random number generator (RNG), game-outcome logic, and game assets (e.g., art, sound, etc.)—all of which obtained regulatory approval from a gaming control board or commission and are verified by a trusted authentication program in the main memory 44 prior to game execution. The authentication program generates a live authentication code (e.g., digital signature or hash) from the memory contents and compares it to a trusted code stored in the main memory 44. If the codes match, authentication is deemed a success and the game is permitted to execute. If, however, the codes do not match, authentication is deemed a failure that must be corrected prior to game execution. Without this predictable and repeatable authentication, the gaming machine 10, external system 60, or both are not allowed to perform or execute the RNG programming or game-outcome logic in a regulatory-approved manner and are therefore unacceptable for commercial use. In other words, through the use of the authentication program, the game-logic circuitry facilitates operation of the game in a way that a person making calculations or computations could not.

When a wagering-game instance is executed, the CPU 42 (comprising one or more processors or controllers) executes the RNG programming to generate one or more pseudo-random numbers. The pseudo-random numbers are divided into different ranges, and each range is associated with a respective game outcome. Accordingly, the pseudo-random numbers are utilized by the CPU 42 when executing the game-outcome logic to determine a resultant outcome for that instance of the wagering game. The resultant outcome is then presented to a player of the gaming machine 10 by accessing the associated game assets, required for the resultant outcome, from the main memory 44. The CPU 42 causes the game assets to be presented to the player as outputs from the gaming machine 10 (e.g., audio and video presentations). Instead of a pseudo-RNG, the game outcome may be derived from random numbers generated by a physical RNG that measures some physical phenomenon that is expected to be random and then compensates for possible biases in the measurement process. Whether the RNG is a pseudo-RNG or physical RNG, the RNG uses a seeding process that relies upon an unpredictable factor (e.g., human interaction of turning a key) and cycles continuously in the background between games and during game play at a speed that cannot be timed by the player. Accordingly, the RNG cannot be carried out manually by a human and is integral to operating the game.

The gaming machine 10 may be used to play central determination games, such as electronic pull-tab and bingo games. In an electronic pull-tab game, the RNG is used to randomize the distribution of outcomes in a pool and/or to select which outcome is drawn from the pool of outcomes when the player requests to play the game. In an electronic bingo game, the RNG is used to randomly draw numbers that players match against numbers printed on their electronic bingo card.

The gaming machine 10 may include additional peripheral devices or more than one of each component shown in FIG. 2. Any component of the gaming-machine architecture includes hardware, firmware, or tangible machine-readable storage media including instructions for performing the operations described herein. Machine-readable storage media includes any mechanism that stores information and provides the information in a form readable by a machine (e.g., gaming terminal, computer, etc.). For example, machine-readable storage media includes read only memory (ROM), random access memory (RAM), magnetic-disk storage media, optical storage media, flash memory, etc.

In accordance with various methods of conducting a wagering game on a gaming system in accord with the present concepts, the wagering game includes a game sequence in which a player makes a wager, and a wagering-game outcome is provided or displayed in response to the wager being received or detected. The wagering-game outcome, for that particular wagering-game instance, is then revealed to the player in due course following initiation of the wagering game. The method comprises the acts of conducting the wagering game using a gaming apparatus, such as the gaming machine 10 depicted in FIG. 1, following receipt of an input from the player to initiate a wagering-game instance. The gaming machine 10 then communicates the wagering-game outcome to the player via one or more output devices (e.g., primary presentation device 18 or secondary presentation device 20) through the presentation of information such as, but not limited to, text, graphics, static images, moving images, etc., or any combination thereof. In accord with the method of conducting the wagering game, the game-logic circuitry 40 transforms a physical player input, such as a player's pressing of a "Spin" touch key or button, into an electronic data signal indicative of an instruction relating to the wagering game (e.g., an electronic data signal bearing data on a wager amount).

In the aforementioned method, for each data signal, the game-logic circuitry 40 is configured to process the electronic data signal, to interpret the data signal (e.g., data signals corresponding to a wager input), and to cause further actions associated with the interpretation of the signal in accord with stored instructions relating to such further actions executed by the controller. As one example, the CPU 42 causes the recording of a digital representation of the wager in one or more storage media (e.g., storage unit 56), the CPU 42, in accord with associated stored instructions, causes the changing of a state of the storage media from a first state to a second state. This change in state is, for example, effected by changing a magnetization pattern on a magnetically coated surface of a magnetic storage media or changing a magnetic state of a ferromagnetic surface of a magneto-optical disc storage media, a change in state of transistors or capacitors in a volatile or a non-volatile semiconductor memory (e.g., DRAM, etc.). The noted second state of the data storage media comprises storage in the storage media of data representing the electronic data signal from the CPU 42 (e.g., the wager in the present example). As another example, the CPU 42 further, in accord with the execution of the stored instructions relating to the wagering game, causes the primary presentation device 18, other presentation device, or other output device (e.g., speakers, lights, communication device, etc.) to change from a first state to at least a second state, wherein the second state of the primary presentation device comprises a visual representation of the physical player input (e.g., an acknowledgement to a player), information relating to the physical player input (e.g., an indication of the wager amount), a game sequence, an outcome of the game sequence, or any combination thereof, wherein the game sequence in accord with the present concepts comprises acts described herein. The aforementioned executing of the stored instructions relating to the wagering game is further conducted in accord with a random outcome (e.g., determined by the RNG) that is used by the game-logic circuitry 40 to determine the outcome of the wagering-game instance. In at least some aspects, the game-logic circuitry 40 is configured to determine an outcome of the wagering-game instance at least partially in response to the random parameter.

In one embodiment, the gaming machine 10 and, additionally or alternatively, the external system 60 (e.g., a gaming server), means gaming equipment that meets the hardware and software requirements for fairness, security, and predictability as established by at least one state's gaming control board or commission. Prior to commercial deployment, the gaming machine 10, the external system 60, or both and the casino wagering game played thereon may need to satisfy minimum technical standards and require regulatory approval from a gaming control board or commission (e.g., the Nevada Gaming Commission, Alderney Gambling Control Commission, National Indian Gaming Commission, etc.) charged with regulating casino and other types of gaming in a defined geographical area, such as a state. By way of non-limiting example, a gaming machine in Nevada means a device as set forth in NRS 463.0155, 463.0191, and all other relevant provisions of the Nevada Gaming Control Act, and the gaming machine cannot be deployed for play in Nevada unless it meets the minimum standards set forth in, for example, Technical Standards 1 and 2 and Regulations 5 and 14 issued pursuant to the Nevada Gaming Control Act. Additionally, the gaming machine and the casino wagering game must be approved by the commission pursuant to various provisions in Regulation 14. Comparable statutes, regulations, and technical standards exist in or are used in other gaming jurisdictions, including for example GLI Standard #11 of Gaming Laboratories International (which defines a gaming device in Section 1.5) and N.J.S.A 5:12-23, 5:12-45, and all other relevant provisions of the New Jersey Casino Control Act. As can be seen from the description herein, the gaming machine 10 may be regulatorily approved and thus implemented with hardware and software architectures, circuitry, and other special features that differentiate it from general-purpose computers (e.g., desktop PCs, laptops, and tablets).

Figure 3A:
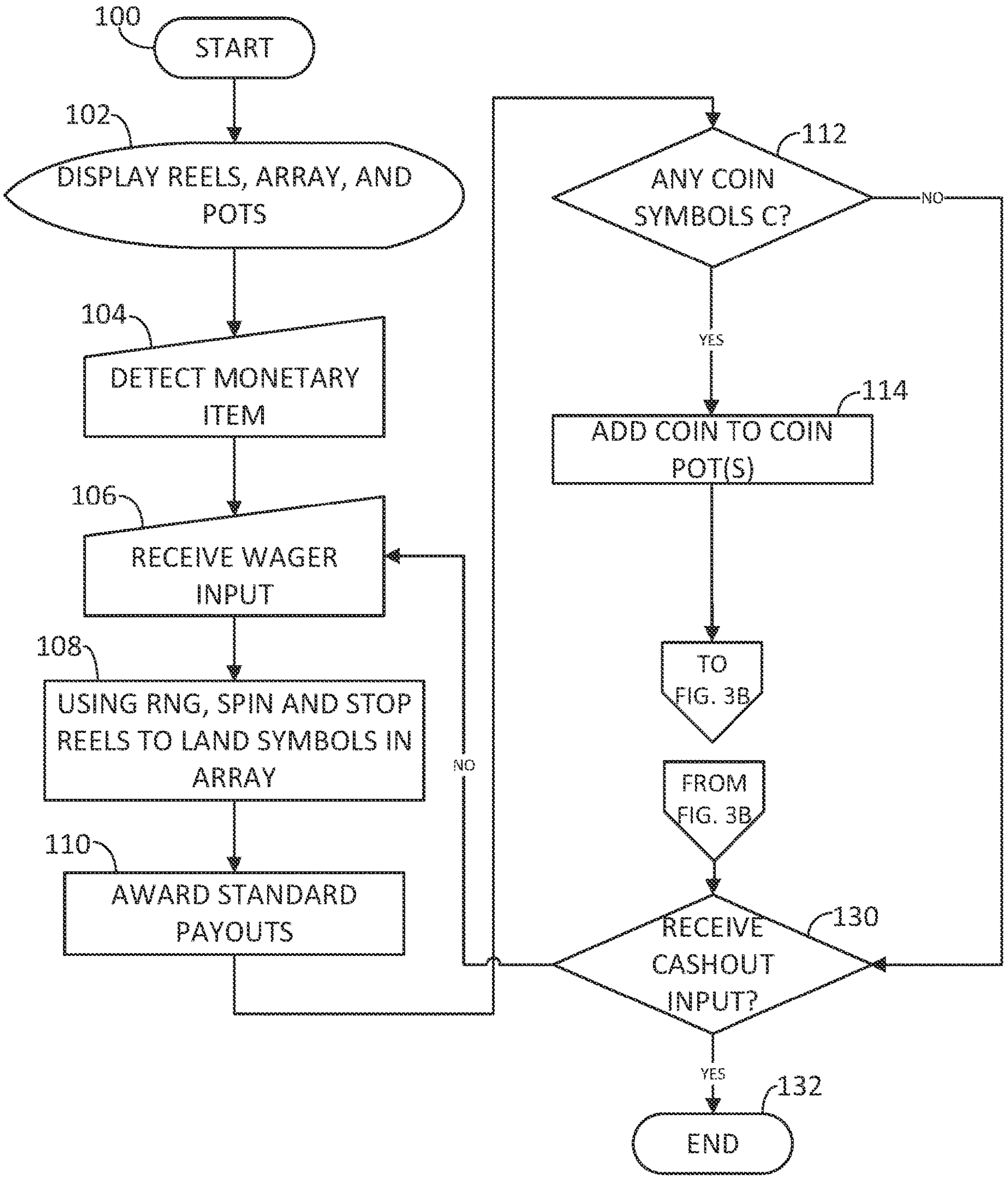
FIGS. 3A and 3B are a flow diagram for a data processing method that corresponds to instructions executed by a controller, according to an embodiment of the present invention.
Figure 3B:
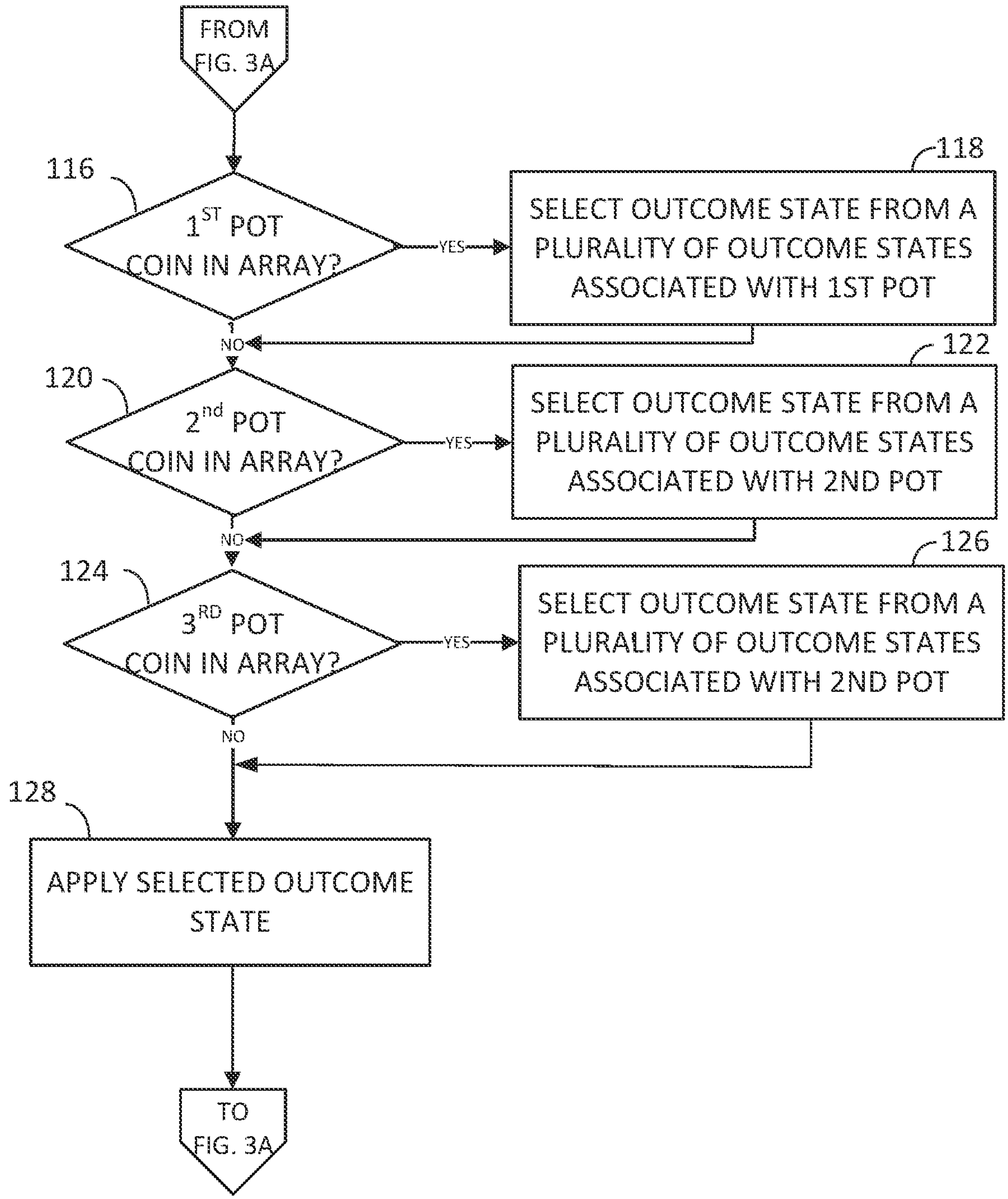

Referring now to FIGS. 3A-3B, there is shown a flow diagram representing one data processing method corresponding to at least some instructions stored and executed by the game-logic circuitry 40 in FIG. 2 to perform operations according to an embodiment of the present invention. The data processing method is described below in connection with the exemplary presentations of a spin outcome in FIG. 4.

Referring to FIG. 3A, the data processing method commences at step 100. At step 102, the game-logic circuitry controls one or more presentation devices (e.g., mechanical-reel display device, video display device, or a combination thereof) to present a plurality of symbol-bearing reels, an array of symbol positions, and a feature-triggering perceived persistent element (e.g., one or more coin pots). Although the method is described with respect to one presentation device, it is to be understood that the presentation described herein may be performed by a presentation assembly including more than one presentation device. The symbol positions of the array may be arranged in a variety of configurations, formats, or structures and may comprise a plurality of rows and columns. The rows of the array are oriented in a generally horizontal direction, and the columns of the array are oriented in a generally vertical direction. The symbol positions in each row of the array are horizontally aligned with each other, and the symbol positions in each column of the array are vertically aligned with each other. Alternatively, the symbol positions may be arranged in a honeycomb configuration with adjacent columns vertically offset from each other by one-half symbol position or adjacent rows horizontally offset from each other by one-half symbol position. The number of symbol positions in different rows and/or different columns may vary from each other. The reels may be associated with the respective columns of the array such that the reels spin vertically, and each reel populates a respective column. In another embodiment, the reels may be associated with the respective rows of the array such that the reels spin horizontally, and each reel populates a respective row. In some embodiments, the reels are associated with respective individual symbol positions of the array such that each reel animates in place and populates only its respective symbol position. The symbol array configuration may vary between the base game and any bonus games and/or other game features utilizing the array.

Figure 4:
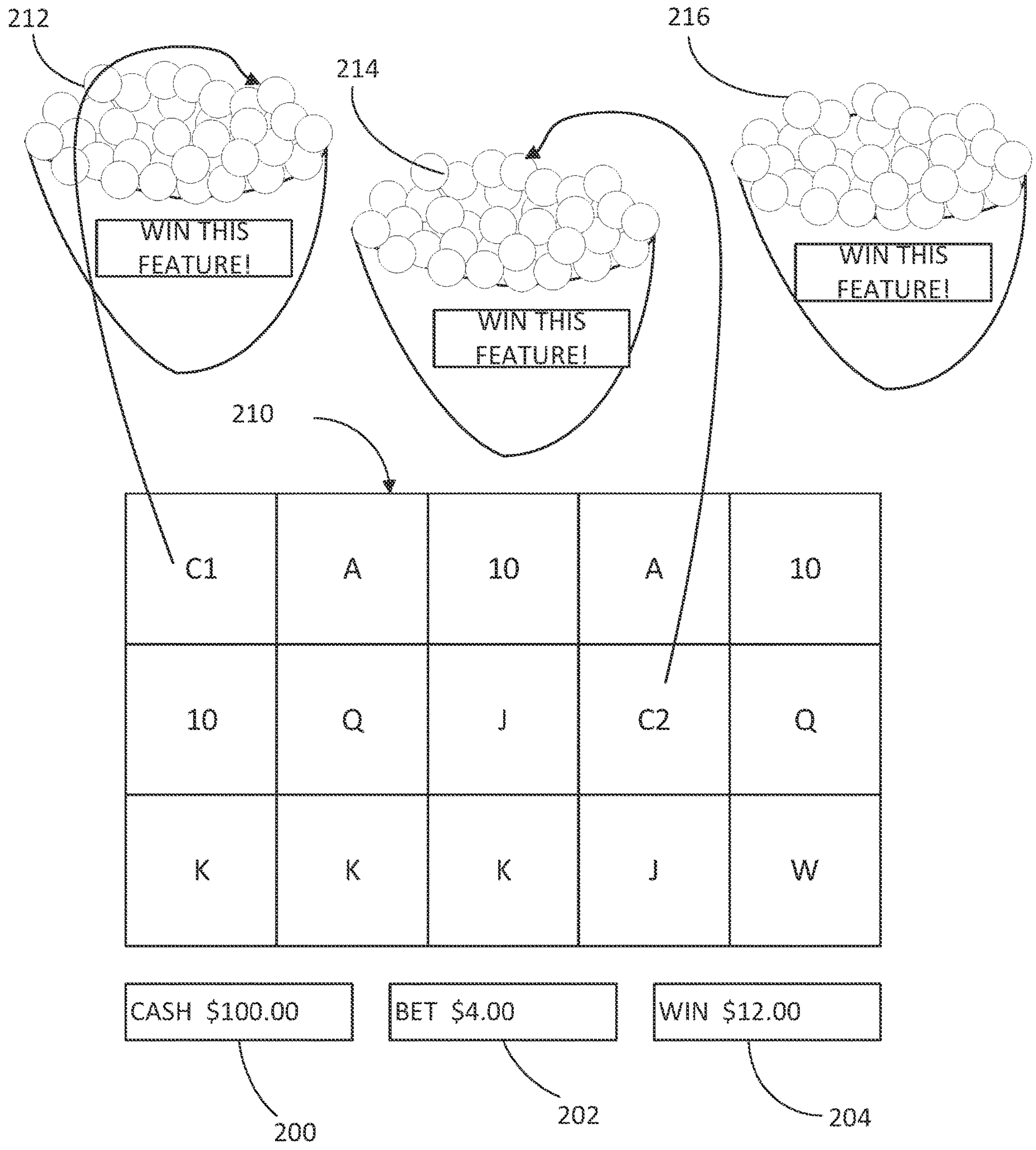
FIG. 4 is an exemplary presentation of a base-game spin outcome resulting from the flow diagram in FIG. 3A.

In FIG. 4, the symbol array 210 in the base game has a three-by-five rectangular configuration, and each symbol position is associated with a respective independent reel. The reels bear a plurality of symbols that may, for example, include royal symbols 10, J, Q, K, and A; a wild symbol W that can substitute for any of the royal symbols; and generic coin symbols C1, C2, C3.

In one or more embodiments, the plurality of symbols also includes value-bearing symbols, otherwise known as WYSIWYG ("What You See is What You Get") or "cash on reels" symbols. Each value-bearing symbol is associated with a credit or currency value indicated on the symbol itself. The value on a particular credit-bearing symbol may be fixed or variable (e.g., random) from one game cycle to the next. Different value-bearing symbols on the reels may have different values. In one or more embodiments, a value-bearing symbol may be associated with a value determined or displayed separately. For example, rather than a specific amount, a GRAND, MAJOR, MINOR, or MINI award label may be indicated on a value-bearing symbol. Each reel may contain one or more stacks (i.e., clumps) of value-bearing symbols that appear adjacent to each other along the reel. The values of the value-bearing symbols in any given stack may be the same or different. A stack of value-bearing symbols may consist of two, three, four, or more adjacent symbols. Further, adjacent reels may contain one or more "mega" value-bearing symbols that move as one block as the reels spin. When the spin is complete, each individual row and column of the array underlying any visible portion of the "mega" symbol is assigned the value associated with the "mega" value-bearing symbol. For example, a "mega" value-bearing symbol may comprise two-row high square spanning the first two columns of the array 210. If this symbol stops aligned with the top two rows of the array 210, the symbols in the first two rows and first two columns would all be treated as though individual value-bearing symbols having the value of the "mega" symbol had landed in those locations.

In at least some embodiments, the coin symbols C1, C2, and C3 are value-bearing symbols. That is, in addition to the functions described herein as feature-triggering symbols, the coin symbols include award indicia to visually indicate a corresponding award value. The award values of the coin symbols may be awarded, manipulated, or otherwise affect awards of the game feature as described herein. In some embodiments, the game feature includes additional or alternative value-bearing symbols. For example, the game feature may include value-bearing symbols without feature-triggering functionality.

At step 104, the game-logic circuitry detects, via a value input device, a physical item associated with a monetary value that establishes a monetary balance in the form of cash or credits. In FIG. 4, the monetary balance may be shown on a meter 200.

At step 106, the game-logic circuitry initiates a base game of a wagering game cycle (i.e., spin cycle) in response to an input indicative of a wager covered by the monetary balance. To initiate a spin of the reels, the player may press a "Spin" or "Max Bet" key on a button panel or touch screen. In FIG. 4, the wager may be shown on a bet meter 202.

At step 108, using an RNG, the game-logic circuitry spins and stops the reels to randomly land symbols from the reels in the array in visual association with one or more paylines (also known as lines, ways, patterns, or arrangements). The reel spin may be animated on a video display by depicting symbol-bearing strips moving vertically across the display and synchronously updating the symbols visible on each strip as the strip moves across the display. Alternatively, the reels may be physical/electromechanical reels. FIG. 4 depicts a base-game spin outcome.

At step 110, the game-logic circuitry awards standard payouts in accordance with a pay table. The pay table may, for example, include "line pays," "ways pays" and "scatter pays." Line pays occur when a predetermined type and number of symbols appear along an activated payline, typically in a particular order such as left to right, right to left, top to bottom, bottom to top, etc. Ways pays appear on adjacent reels without the requirement to be on a specified pay line or directly adjacent to one another. Scatter pays occur when a predetermined type and number of symbols appear anywhere in the displayed array without regard to position or paylines. Each payline preferably consists of a single symbol position in each column of the array. The number of paylines may be as few as one or as many as possible given each payline consists of a single symbol position in each column of the array. To animate a standard pay, the display may apply a border, pattern, color change, background change, watermark, or other distinguishing characteristic to the winning payline and/or winning symbols that contributed to the pay. FIG. 4, for example, depicts a line pay of three K symbols in the bottom row of the array 210. The awarded pay is added to a win meter 204.

At step 112, the game-logic circuitry determines whether or not any coin symbols C1, C2 or C3 landed in the array. If a coin symbol C1, C2 or C3 did not land in the array, the game-logic circuitry immediately proceeds to step 130. If, however, one or more coin symbols C1, C2 or C3 landed in the array as shown in FIG. 4, the game-logic circuitry proceeds to step 114. At step 114, the game-logic circuitry animates the addition of each coin symbol C1, C2 or C3 to a persistent element such as a coin pot (FIG. 4; 212, 214, 216) associated with the respective coin symbol C1, C2 or C3. For example, the coin symbol C2 in the center column of FIG. 4 may be animated to "fly" off the array and land in the middle of its associated coin pot 212. To represent the addition of the coin symbol to the coin pot, the pot and/or the volume of coins therein may appear to grow in size. In FIG. 4, the transfer of the coin symbol C2 to the middle coin pot 214 is represented by an arrow. The persistent elements may take forms other than the coin pots 212, 214, 216, including for example urns, vases, jars, jugs, cans, bowls, piggy banks, beehives, inflating balloons, ladders, dials, meters, etc. In accordance with some embodiments, the persistent element may be an object of fixed size accompanied by some other indication of accumulating value, for example, by a gradual change in color. In other embodiments, the persistent element may change size and also show some other indication of increasing value, for example, the color of the display in the immediate area of the persistent element may gradually change as its value increases.

During a player's gaming session, the growth in size of the coin pots 212, 214 216 in FIG. 4 may persist from one wagering game cycle to the next such that the player perceives that the corresponding game feature may be getting closer to being triggered. This kind of game is known as a "perceived persistence" game. Unlike a true "persistence game," wherein the size of each coin pot or the observable quantity of its contents serves as an indication of the probability that its associated bonus or game feature will be triggered. In both cases, when the bonus or game feature associated with a pot is triggered, at least some of the contents of the pot are visually removed and the accumulation of coins in that pot during subsequent game spin cycles resumes from that point.

In response to detecting the presence of one or more coin symbols (i.e., at step 112), the game-logic circuitry performs the determinations at steps 116, 120, and 124 as shown in FIG. 3B. More specifically, the game-logic circuitry determines which pots are associated with each coin symbol within the array. Although the determinations are shown following the animation of step 114, the steps shown in FIG. 3B may be performed before, after, and/or during the step 114. For example, the animation of adding the coins to the respective pots may be in response to the respective determinations of steps 116, 120, and/or 124.

The determinations at steps 116, 120, and/or 124 may occur in series (as shown in FIG. 3B) or in parallel. The order of the determinations may be predefined, random, or variable depending on the state of the game-logic circuitry and/or the game feature. If no coin symbol is detected in the array for a particular pot, the method 100 proceeds to the next determination or awaits step 128 as described herein. If a coin symbol associated with a particular pot is detected in the array at steps 116, 120, and/or 124, the method 100 proceeds to steps 118, 122, and/or 126, respectively. More specifically, the game-logic circuitry selects an outcome state associated with the catalyst event (i.e., the coin symbol of a particular pot landing in the array).

The outcome state is randomly selected via RNG from a plurality of outcome states associated with the catalyst event (or type of catalyst event detected). In one example, the outcome states include a first state associated with one or more bonus game features, a second state associated with the award value indicated by the coin symbol, and a third state associated with visual changes to the game interface, such as visually modifying an appearance of the corresponding pot. The available outcome states are different for each pot (i.e., each type of catalyst event), though the set of available outcome states may be similar across some or all of the catalyst event types. For example, each pot may be associated with a similar three-state set of outcome states as described above, but the triggered game feature is different for each pot and the award value is dependent upon the corresponding coin symbol. In other embodiments, additional or alternative outcome states are available for selection for each catalyst event, and/or the selection of an outcome state may be predefined or based at least partially on game events or conditions (e.g., the outcome selection is based on the state of the array and one or more random determinations).

Following steps 116-126, the game-logic circuitry is configured to apply any of the selected outcome states at step 128. That is, the selected outcome state is associated with a game feature, the game feature may be initiated. If the selected outcome state is associated with an award (e.g., an award associated with one or more value-bearing symbols), the award may be provided via an award sequence. If the selected outcome is associated with a visual change or sequence (without any impact to the gameplay), the visual change or sequence is presented by the presentation assembly. If multiple coin symbols are within the array (as shown in FIG. 4), multiple outcome states may be selected and applied. In certain embodiments, one outcome state is applied per game cycle. In such embodiments, any remaining selected outcome states are ignored or applied to other game cycles. The applied outcome state may be selected from the outcome states randomly, partially randomly, based on a hierarchical order, and/or other suitable conditions or events within the game feature. In one example, the number of applied outcome states may be based on the wager amount and/or frequency of the player.

For outcome states associated with a game feature, the game feature may be initiated and completed prior to the subsequent game cycle. In some embodiments, a game feature simply awards a prize, for example a fixed or progressive jackpot amount. In some embodiments, a game feature may comprise any type of bonus game. The term "bonus game" as used herein refers to a game feature that functions through additional, fewer, or alternative game logic and/or game elements relative to the base game feature. Non-limiting examples of bonus games include a certain number of free games (i.e., spins of the reels), a "pick' em" bonus game, a wheel-spinning game, etc. In embodiments offering a free spin bonus game, the free spins may be played as a "hold and spin" game in which certain types of symbols, once landed in the array, are held in place and persist in the array for at least one additional free spin cycle. These persistent symbols may include value-bearing ("WYSIWYG") symbols, wild symbols or other symbols that may improve the chances of winning or provide higher pays. In still other embodiments, a bonus game may be played to determine a game enhancement (described further below) or payment of prize, for example, a fixed or progressive jackpot (described above). The game enhancement may be applied to an outcome of the bonus game, the current base game or one or more future play cycles of the same bonus game, a different bonus game or the base game.

In some embodiments, a game feature may comprise an enhancement to the game. An enhancement may include, without limitation, pay table modifiers such as multipliers, increased values on value-bearing symbols, modification to the reels to include improved symbols, such as wild symbols, modification to symbol weights, removal of certain "blocking symbols", award value modification (for value-bearing symbols, awards to be provided to the player, other suitable awards), additional rows or columns added to the array, additional free spins, replacement symbols for symbols already present in the array, etc. The enhancement may be applied to the current base game outcome or may be applied to one or more subsequent game features or wagered base game plays.

Each game feature may have a different impact on the expected value (EV) of the game. The relative frequency of the game features may be controlled by adjusting how frequently the associated coins C1, C2 and C3 appear in the array, for example, by their relative weighted appearances on the reels. Thus, a less lucrative game feature may be won more frequently, for example, approximately once in every ten game spin cycles, while a higher paying game feature may only occur approximately once in every one hundred game spin cycles. This allows game features to be triggered more often, for player enjoyment, while maintaining the overall expected EV of the wagering game.

To present a game feature and any enhancements enabled in steps 116-126, at step 128 the game-logic circuitry may control one or more presentation devices (e.g., mechanical-reel display device, video display device, or a combination thereof) to present a bonus game array and/or other suitable bonus game elements (e.g., an award wheel). The bonus game array may have the same configuration as the base game array or may have a different configuration than the base game array. Additional and/or alternative animations and/or game elements may be presented. For example, the pots not associated with the applied outcome state may be hidden from the presentation assembly while the pots associated with the applied outcome state remain or are presented in a highlighted or altered state. If the game feature includes generating one or more bonus outcomes, symbol-bearing bonus reels are spun and stopped within the bonus array, and one or more enhancements may be applied to form the bonus game outcome. Following the completion of the game feature, the array (and the corresponding reel strips) may be returned to the base game form.

At step 130, the game-logic circuitry determines whether or not it has received a cashout input via at least one of the one or more player input devices of the gaming machine. If it has not received a cashout input, the game-logic circuitry waits for the next wager input at step 106. If it has received a cashout input, the game-logic circuitry initiates a payout from the monetary balance on the meter 200 in FIG. 4. The data processing method then ends at step 132.

The recitations of a value input device for establishing a credit balance, an input device for accepting a wager input that initiates a spin, and a value output device for paying out the credit balance are integrally incorporated within the steps of the data processing method. For example, the presentation of game outcomes through the spinning and stopping of the reels is essential to the game outcome determinations, which may only be initiated by the accepted wager input. Furthermore, a value input device for establishing a credit balance, an input device for accepting a wager that initiates a spin, and a value output device for paying out the credit balance are physical, structural elements that are not shared by generic or well-known computing devices but, rather, are particular to gaming machines.

Figure 5:
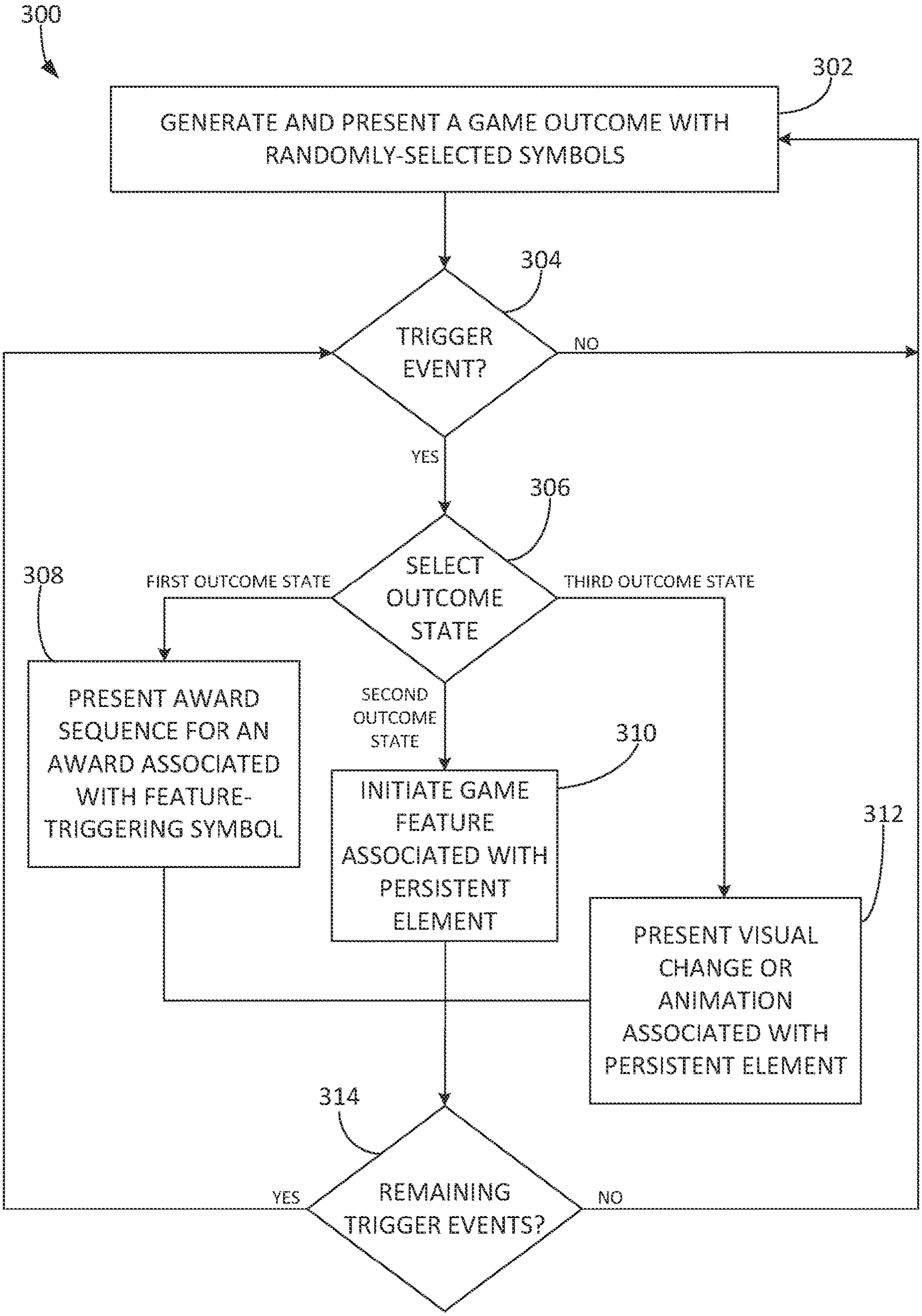
FIG. 5 is a flow diagram of an exemplary method for selecting outcome states for trigger events using a gaming system according to an embodiment of the present invention.

FIG. 5 depicts a flow diagram of an example method 300 for conducting a game with multiple outcome states using a gaming system (e.g., the system shown in FIGS. 1 and 2). The method 300 may be at least partially performed using game-logic circuitry in communication with a presentation assembly of a gaming machine. The game-logic circuitry may be at least partially integrated within the gaming machine. The method 300 may be integrated with other methods of operating the gaming machine, such as the method 100. In other embodiments, the method 300 includes additional, fewer, or alternative steps, including those described elsewhere herein.

In the example embodiment, the method 300 is associated with a game using a symbol array of symbol positions. At step 302, the game-logic circuitry generates a game outcome including randomly-selected symbols from one or more sets of available symbols and causes the presentation assembly to populate the array with the selected symbols. In at least some embodiments, the sets of available symbols are symbol-bearing reel strips associated with one or more respective symbol positions. In such embodiments, the game-logic circuitry is configured to randomly select a reel stop position (or one or more symbols from the reel strip), and the presentation assembly is configured to animate the reel strips to spin and stop on the selected reel stop position or symbols.

In the example embodiment, the reel strips (or sets of available symbols) include feature-triggering symbols. At least a portion of the feature-triggering symbols include award indicia that visibly indicate a respective award value to be selectively awarded as described herein. In certain embodiments, other feature-triggering symbols without award indicia and/or value-bearing symbols without feature-triggering functionality are included within the reel strips. Each feature-triggering symbol is associated with one or more persistent game elements (e.g., pots) presented by the presentation assembly. The association between each feature-triggering symbol and the persistent game elements may be visually indicated through shared or complimentary visual characteristics (e.g., background color, shape, text, etc.). In one example, a feature-triggering symbol associated with two or more persistent elements includes a multi-colored background including the colors of the associated persistent elements. In another example, the background color of the feature-triggering symbol is a blend or gradient of the colors corresponding to the associated persistent elements.

The game-logic circuitry is configured to detect one or more trigger events within the game outcome. In the example embodiment, the trigger event includes the presence of a feature-triggering symbol (or combination of symbols including one or more feature-triggering symbols) within the game outcome. In other embodiments, additional or alternative trigger events may be detectable within the game outcome, including trigger events unassociated with the feature-triggering symbols. In at least some embodiments, multiple trigger events may be detected within a single game outcome. In certain embodiments, a maximum number of trigger events (e.g., one or two) may be active in a given game outcome, where additional trigger events are either removed from the game outcome or remain inactive. In such embodiments, the game-logic circuitry determines which trigger events to activate (as described in the steps herein) based on a predefined order, the state of the game outcome, and/or randomly. In one example, one trigger event can be active for each persistent element, and the trigger event with the greatest value to the player is selected to be active for a given persistent element.

At step 304, the game-logic circuitry determines if any trigger event is within the game outcome. In the example embodiment, the game-logic circuitry detects a trigger event for each respective feature-triggering symbol within the game outcome. If no trigger events are detected, the game-logic circuitry is configured to perform any other outcome determinations (e.g., detecting winning symbol combinations, bonus game detection, etc.) before proceeding to the next game outcome at step 302. If a trigger event is detected, the game-logic circuitry proceeds to step 306.

At step 306, for each trigger event, the game-logic circuitry selects a corresponding outcome state. In the example embodiment, the outcome state is selected from at least three outcome states: a first outcome state associated with an award, a second outcome state associated with a game feature, and a third outcome state associated with a visual change. Additional or alternative outcome states may be selectable. In certain embodiments, for a given selection, only a subset of the outcome states may be selectable, where the subset is predefined, based on one or more parameters, and/or random. The general category of outcome states may be the same for each trigger event, but the particular award, game feature, visual change, and the like may be dependent upon various aspects associated with the trigger event (including random determinations). The selection process may include one or more visual indications or animations to convey the selection to the player, such as animating the feature-triggering symbol to the corresponding persistent element to reveal the selected outcome state. The selection may be predefined, based on the state of the game or trigger event, and/or at least partially random.

At step 308, if a first outcome state is selected, the game-logic circuitry causes the presentation assembly to present an award sequence for an award associated with the corresponding feature-triggering symbol. In the example embodiment, the feature-triggering symbol is a value-bearing symbol including award indicia that visually indicates a corresponding award value, and the award sequence includes the indicated award value. Additional awards (e.g., awards from other value-bearing symbols) may be aggregated with the indicated award value.

At step 310, the second outcome state is selected, and the corresponding game feature associated with the persistent element (and/or other elements of the trigger event) is initiated. In one example, the game feature is a hold and respin feature, where value-bearing symbols and other special symbols are held within the symbol array over a plurality of bonus spins to determine one or more bonus awards. The game feature may be shared between multiple trigger events, where each trigger event modifies or enhances the play of the game feature. For example, one trigger event may award additional bonus game spins, where another trigger event increases the size of the symbol array (thereby increasing the opportunity to land value-bearing symbols within the bonus game outcomes). If multiple trigger events are associated with the same modifier, the modifier may be enhanced, or additional modifications may be made to the game feature.

At step 312, the third outcome state is selected, and the game-logic circuitry causes the presentation assembly to present a visual change or animation associated with the persistent element corresponding to the trigger event. That is, if the third outcome state is selected, no award is provided, and no game feature is triggered. In at least some embodiments, the third outcome state does not impact the state of the game, including the state of the game for subsequent game outcomes. In other embodiments, the third outcome state results in changes to the game state, such as weight parameters that impact subsequent random determinations (e.g., which symbols are included in a game outcome or what outcome state is selected).

In response to the determination at step 306 and the actions associated with each outcome state, the game-logic circuitry determines if any trigger events remain from the game outcome at step 314. If one or more trigger events remain, the game-logic circuitry and presentation assembly perform the steps 306-312 for each remaining trigger event. If no trigger event remains, the game-logic circuitry and presentation assembly are configured to generate a subsequent game outcome at step 302 and/or await player input indicating a subsequent action of the gaming machine. That is, the player may be required to provide player input to initiate a wager for the next game outcome or player input to initiate a cash out sequence to conclude a gaming session at the gaming machine. For a bonus game feature or automated game feature (e.g., a game feature in which wagers are applied automatically or for a set of game outcomes), the subsequent game outcome may be generated and/or presented without requiring player input.

In at least some embodiments, the actions associated with each trigger event (i.e., the actions selected at steps 308-312) may be at least partially combined together in response to detecting multiple trigger events. In one example, all changes or updates to the game presentation by the presentation assembly may be presented within a unified trigger event presentation, where at least some actions may be presented in a at least partially overlapping sequence. That is, if multiple trigger events result in a third outcome state associated with the step 312 being selected, the visual changes for each trigger event may be animated simultaneously, with at least partially overlapping timing, or otherwise linked to each other (e.g., if the visual change is the growth of a graphical element, the graphical element is animated to grow to a level matching the number of corresponding trigger events). As a result, the presentation of the actions performed at steps 308-312 may await until the determination at step 314 indicates no trigger events remain. For example, any selections of the second outcome state at step 310 may result in a single game feature incorporating the functions and/or modifications associated with each second outcome state selection.

In other embodiments, if multiple trigger events are detected, the game-logic circuitry may be configured to perform an additional selection of a subset of the detected trigger events. In one example, the game-logic circuitry selects a single trigger event to perform the selection and action in steps 306-312. In another example, the game-logic circuitry selects up to three trigger events (or another suitable number of trigger events) to activate. In a further example, the game-logic circuitry selects one trigger event for each persistent element. The selection (i.e., the number of selections and/or which trigger events are selected) may be partially random, fully random, based on a hierarchical order, the state of the game feature, wager parameters, and/or other suitable parameters associated with the game feature.

In certain embodiments, the persistent elements are associated with additional outcome states and/or the outcome states may be at least partially dynamic. That is, in one example, the game enhancement associated with the second outcome state may be enhanced or otherwise modified in response to a modification event occurring within the game. In such an example, if a given persistent element include a game enhancement that extends the feature game by one additional spin, the modification event may cause the second outcome state to result in two or more free spins to be added to the feature game. Other similar and suitable modifications to the game enhancements described herein may be used. The modification event may be any suitable event and/or game condition associated with the game, such as the presence or absence of one or more particular symbols, achieving wagering and/or playtime thresholds, and the like.

In embodiments with more that the three outcome states shown with respect to the method 300, the additional outcome states may be similar to one or more of the three outcome states described above, or the outcome states may provide different functionality and/or presentation. For example, a fourth outcome state may be associated with a progressive jackpot, where the selection of the fourth outcome state awards the progressive jackpot or progresses the player towards receiving the progressive jackpot award (e.g., selecting the fourth outcome state three times or three times in a row causes the corresponding progressive jackpot to be awarded). In certain embodiments, the number of outcome states is less than three and/or includes alternate outcome states to the three outcome states described with respect to the method 300.

Figure 6A:
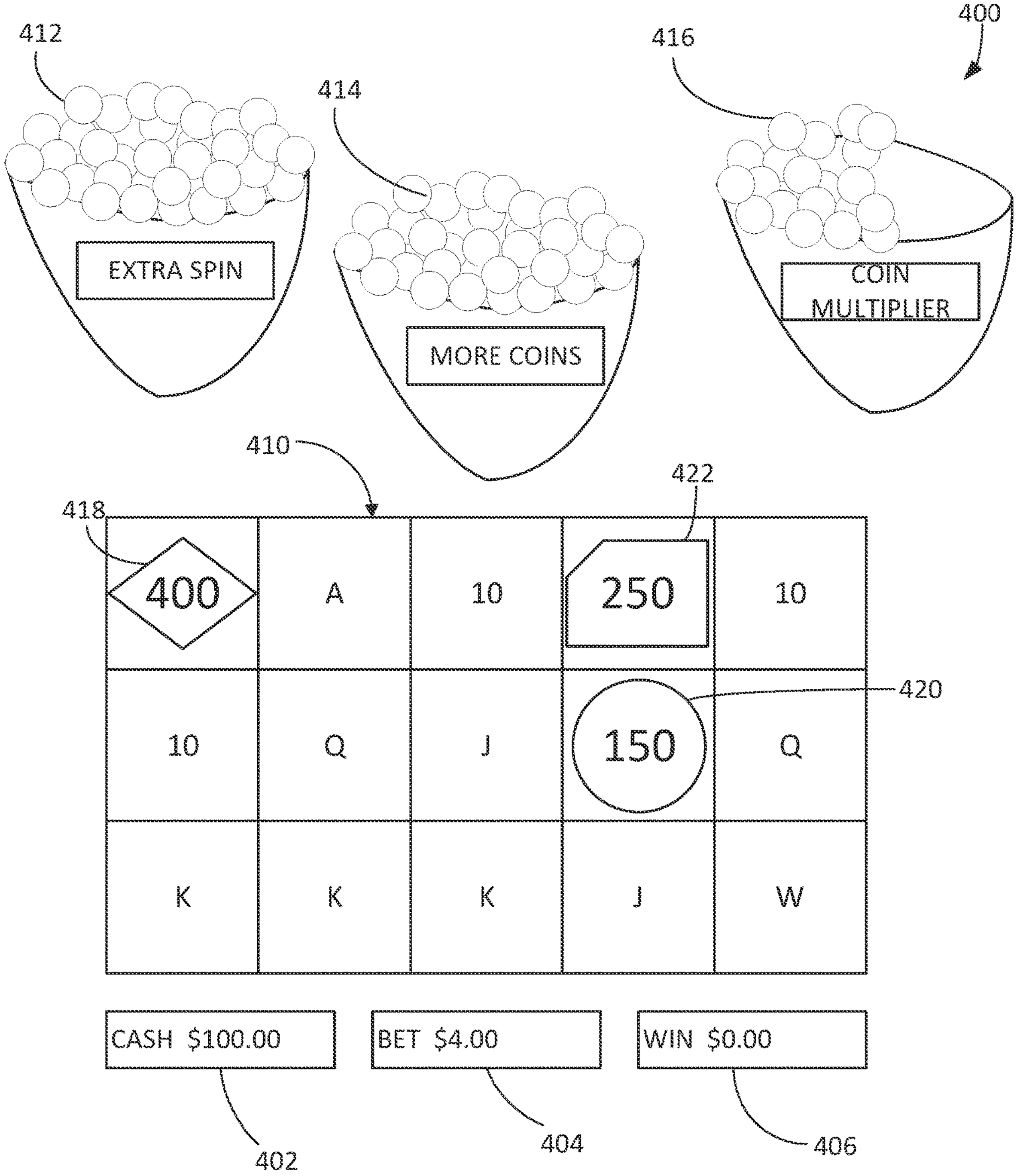
FIG. 6A is an exemplary game interface presentation of a gaming system in a first state according to an embodiment of the present invention.
Figure 6B:
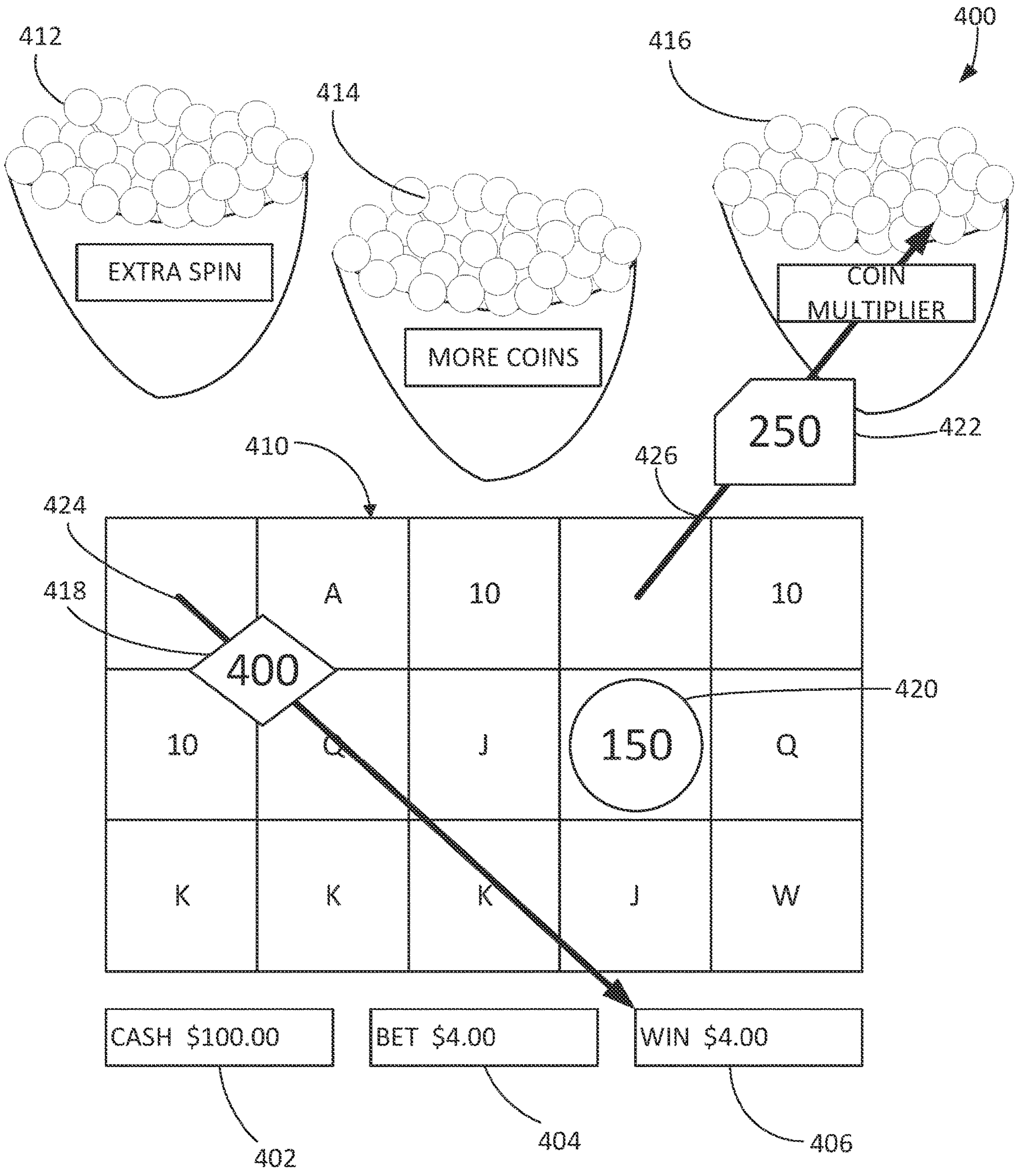
FIG. 6B is the game interface presentation of FIG. 6A in a second state according to an embodiment of the present invention.
Figure 6C:
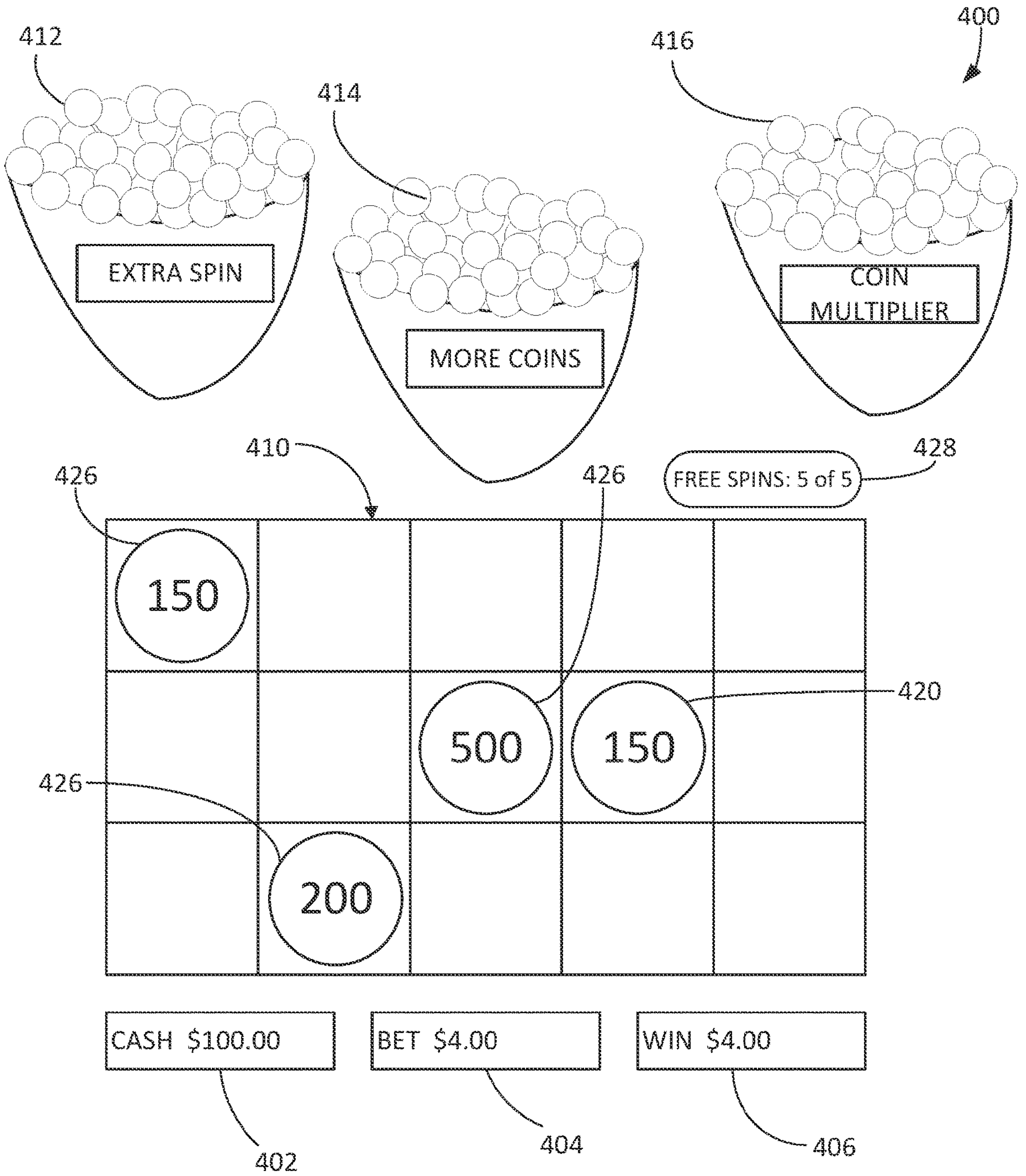
FIG. 6C is the game interface presentation of FIG. 6A in a third state according to an embodiment of the present invention.

FIGS. 6A-6C depict a game interface 400 of an exemplary game feature of a gaming system according to one or more aspects of the present disclosure. More specifically, FIGS. 6A-6C depict the game interface 400 in a plurality of states: FIG. 6A depicts the interface 400 in a first state, FIG. 6B depicts the interface 400 in a second state following the first state, and FIG. 6C depicts the interface 400 in a third state following the second state. Although one sequence of states is shown, it is to be understood that the order and/or presentation of the states and the underlying game events and actions may be rearranged, partially different, or altogether different according to the particular configuration of the game feature and the interface 400.

The game interface 400, similar to the interface shown in FIG. 4, includes a balance meter 402, a bet meter 404, a win meter 406, a symbol array 410, a first persistent element 412, a second persistent element 414, and a third persistent element 416. In other embodiments, the game interface 400 includes additional, fewer, or alternative game and/or presentation elements, including those described elsewhere herein. For example, the game interface 400 may include additional or fewer persistent elements (e.g., one, two, four or five persistent elements).

The persistent elements 412, 414, and 416 are configured to be associated with respective trigger events. In the example embodiment, a trigger event includes detection of a trigger symbol within the symbol array 410. In other embodiments, additional or alternative trigger events may be detectable and associated with the persistent elements. The persistent elements 412, 414, and 416 include a dynamic presentation and feature indicia. In the illustrated embodiment, the dynamic presentation of the persistent elements 412, 414, and 416 is represented by a number of coins, balls, or other objects occupying a pot. In other embodiments, other suitable visual presentation elements and/or animations may be used for the dynamic presentation. The dynamic presentation may be used to visually convey a state of the corresponding persistent element in embodiments with persistence or to visually convey perceived persistence. That is, in persistent embodiments, changes to the visual appearance to the persistent element correspond to changes to underlying game parameters that influence subsequent random determinations, while perceived persistence makes the visual changes without impacting subsequent random game determinations. The dynamic presentation may be advanced through levels of presentations (e.g., from an empty pot to a full pot and back to an empty pot), or the dynamic presentation may be updated based on one more game conditions or events. For example, the number of coins added to a pot may be based on one or more aspects of the corresponding trigger event (e.g., the award value of a trigger symbol).

In addition to the dynamic presentation, the persistent elements 412, 414, and 416 each include respective feature indicia. The feature indicia indicates a corresponding modification or game aspect applied to a feature game based on trigger events associated with each persistent element. In the example embodiment, the persistent elements 412, 414, and 416 are associated with the same type of feature game: a hold and respin game where value-bearing symbols are held within the symbol array 410 until a plurality of free spins are completed. Following the free spins, the held value-bearing symbols are aggregated and awarded within an award sequence. Other suitable game features, including a plurality of different game features associated with respective persistent elements, may be used. In other embodiments, a portion or all of the feature indicia of the persistent elements 412, 414, and 416 may not be associated with a separate feature game, but rather indicate modifications to the base game feature, one or more award sequences, a progressive jackpot progression, and/or the like. For example, the feature indicia of one persistent element may indicate a progression towards a progressive jackpot award that is progressed through one or more trigger events. These other forms of feature indicia may be presented in addition to or in place of the feature indicia associated with a feature game. In certain embodiments, the feature indicia (and the corresponding action, event, award, etc.) may change throughout the game. In one example, after the corresponding feature game or other event is initiated, the feature indicia of a given persistent element is updated to visually indicate a different action or event. In another example, the feature indicia of the persistent elements are updated periodically based on one or more counters (e.g., a timer, a game outcome counter, a wager counter, an award counter, a game event counter, etc.).

In the example embodiment, the array 410 is populated with a set of randomly selected symbols of a game outcome. Within the array, several types of symbols may be present. For example, several symbols (e.g., A, K, Q, J, 10) and special symbols (e.g., W) are used to determine winning game outcomes through combinations of symbols within the array 410 via paylines, scatter pay rules, and/or other suitable predetermined rules defining the winning game outcomes. The game-logic circuitry is configured to generate the set of randomly selected symbols through at least one or more random determinations, such as randomly selecting the symbols from one or more weighted tables of available symbols. In at least some embodiments, each weighted table may represent a symbol-bearing reel strip, where the presentation assembly is configured to provide animations to spin and stop the reels such that the selected symbols are present in the array 410. Other suitable forms of selecting and/or presenting the symbols may be used in other embodiments, such as an outcome presentation including randomly cycling through available symbols within the array positions before stopping on the symbols defining the game outcome.

In the example embodiment, the symbols in the array 410 include three value-bearing symbols associated with trigger events. More specifically, the array 410 includes a first trigger symbol 418, a second trigger symbol 420, and a third trigger symbol 422. Each of the trigger symbols 418, 420, and 422 are value-bearing symbols as indicated by the award indicia visually present on each symbol and associated with a corresponding award. The trigger symbols 418, 420, and 422 are different types of trigger symbols as visually indicated by the different shapes of the symbols. Additional or alternative audiovisual characteristics (e.g., color, animation, other graphical elements, etc.) may be used by the presentation assembly to distinguish between trigger symbol types, including characteristics that may be hidden through a portion of the game feature such that two or more trigger symbol types may appear the same while the distinctive characteristics are hidden. In such embodiments with hidden distinctive characteristics, the hidden characteristics may be revealed in response to one or more game events or game conditions, such as the detection of a trigger event.

In the example embodiment, each trigger symbol 418, 420, and 422 is associated with a respective persistent element and a respective type of trigger event. More specifically, the first trigger element 418 is associated with the first persistent element 412, the second trigger symbol 420 is associated with the second persistent element 414, and the third trigger symbol 422 is associated with the third persistent element 416. In at least some embodiments, the persistent elements 412, 414, and 416 include audiovisual characteristics that enable the player to readily understand the link between each persistent element and the corresponding type of trigger symbol. For example, the persistent element and the corresponding trigger symbols may share one or more distinctive colors, shapes, themes, backgrounds, animations, indicia and/or the like within the interface 400.

In some embodiments, these shared characteristics may be at least initially hidden from the game interface 400 and are revealed through one or more suitable animations. For example, in response to a trigger event including a given trigger symbol, the trigger symbol may be animated (e.g., flip, morph, etc.) to visually link the symbol to the persistent element corresponding to the trigger event. In such embodiments, all of the trigger symbols may initially appear to be the same within the game outcome prior to the presentation assembly displaying sequences associated with the trigger event.

In the example embodiment, in the first state shown in FIG. 6A, three trigger events are present in the game outcome. That is, a trigger event is detected for each trigger symbol 418, 420, and 422, where the type of trigger event is based on the trigger symbol type and/or the associated persistent element. In response to detecting each trigger event, the game-logic circuitry is configured to select a corresponding outcome state from a set of available outcome states. In the example embodiment, the set of available outcome states for a given trigger event includes at least three states: a first outcome state associated with the award of the value-bearing trigger symbol, a second outcome state associated with a feature game modification, and a third outcome state associated with a visual update to the corresponding persistent element, which may be performed without impact to subsequent game determinations and/or awards. Other suitable outcome states, such as an outcome state for progressing towards a jackpot award, may be available. In some embodiments, one or more outcome states may be selectively available. For example, for a given type of trigger event, the outcome state in the immediately preceding trigger event of the same type may not be available for selection.

Although the outcome states selectable for each type of trigger event may be the same or at least partially overlapping, the particular action or effect of the outcome states may be at least partially based on the state of the game and/or the elements associated with the corresponding trigger event. For example, the award value of the first outcome state is based on the award value of the trigger symbol, the game modification or feature game of the second outcome state is associated with the persistent element, and the particular animation or visual update of the third outcome state is based on the current visual state of the persistent element. In some embodiments, some types of trigger events may include outcome states associated with a plurality of trigger symbols and/or persistent elements. For example, a fourth type of trigger symbol may be associated with all of the persistent elements 412, 414, and 416, and therefore the second outcome state would be associated with all of the feature game modifications indicated by the feature indicia of the three persistent elements.

In the example embodiment, in the second state shown in FIG. 6B, the first outcome state has been selected for the trigger event associated with the first trigger symbol 418. In the illustrated embodiment, the presentation assembly is configured to present an award sequence for the award value indicated by the first trigger symbol 418 by animating the first trigger symbol to fly towards the win meter 406 as indicated by an arrow 424 and update the win meter 406 to include the value of the first trigger symbol 418. The first trigger symbol 418 may then be removed from the interface 400 or be presented in an inactive state. Additional or alternative animations of the outcome state selection and/or the award sequence may be used. For example, to visually indicate the outcome state selection process, the first trigger symbol 418 and/or the first persistent element 412 may be animated through a selection sequence (e.g., the first trigger symbol 418 is animated to move towards the first persistent element 412 prior to moving towards the win meter 406). If other trigger events resulted in the first outcome state being selected, the award sequence may include the award values of the corresponding trigger symbols such that the win meter 406 is updated to include the award values either as an aggregated award value or as sequential award values applied to the credit meter 402.

In the example embodiment, the third outcome state was selected for the trigger event associated with the third trigger symbol 422. In the example embodiment, the third outcome state is not associated with an award or game modification, but instead results in a visual change to the third persistent element 416. That is, the third outcome state does not affect current or subsequent game determinations. In other embodiments, the third outcome state does change game parameters (e.g., weight parameters, awards, etc.) associated with the third persistent element 416 and its corresponding trigger events. Such changes to the game parameters may be visually reflected through the visual changes to the third persistent element 416. In the illustrated embodiment, the visual change to the third persistent element 416 includes increasing the number of coins within the persistent element 416 (i.e., the visual change in the third persistent element 416 from FIG. 6A to FIG. 6B). Additional or alternative suitable visual changes may be used according to the configuration of the game interface 400. In some embodiments, the visual changes to the third persistent element 416 may occur within predefined levels or stages, where each selection of the third outcome state associated with the third persistent element 416 increases the to the next level up to a maximum level. Each level is associated with a predefined animation and/or presentation elements (e.g., number and configuration of coins). In certain embodiments, the visual change may be at least partially based on the value of the third trigger symbol 422, where a greater value of the trigger symbol is reflected by an enhanced visual change. In at least some embodiments, the persistent elements have a maximum visual state in which no further visual changes are applied in response to the selection of the third outcome state. In certain embodiments, alternative or reduced animations and/or presentation elements may be provided in response to the third outcome state while the persistent element is in a maximum visual state.

In the example embodiment, to indicate the selection of the third outcome state, the third trigger symbol 422 is animated by the presentation assembly to move towards the third persistent element 416 as indicated by an arrow 426 and update the visual presentation of the third persistent element 416. Additional or alternative animations and/or other visual updates may be performed to visually convey the third outcome state and its corresponding elements to the player. Similar to the first trigger symbol 418, the animation of the third trigger symbol 422 may include removing the third trigger symbol 422 from the interface 400 or presenting the trigger symbol 422 in an inactive state.

In the example embodiment, the second outcome state was selected for the trigger event associated with the second trigger symbol 420. In response to any trigger events resulting in a second outcome state selection, a feature game is triggered. The feature game is a limited duration game, where the duration may be defined through one or more counters (e.g., time, outcome, award, game event, and/or other suitable event counters). The feature game may include the same, similar, or different rules and configurations to the base game feature. In one example, the feature game includes the same rules as the base game feature but with enhanced awards and/or probabilities for achieving winning outcomes. In another example, the feature game is performed using other game elements in addition to or in place of the symbol array 410, such as an award wheel. In the example embodiment, as described herein, the feature game is a hold and respin game within the symbol array 410 using value-bearing symbols for a number of free spins (i.e., no wagers required for the feature game).

In the example embodiment, the feature game is initiated after other outcome states have been presented. If the second outcome state is selected for a plurality of trigger events, one instance of the feature game is initiated with a plurality of modifications and/or enhancements based on the corresponding trigger events. In other embodiments, additional instances of the feature game are initiated and/or the duration of the feature game may be extended in response to a plurality of second outcome state selections. In certain embodiments, the feature game is initiated with only a portion of the modifications and/or enhancements associated with the trigger events. Although the feature game is shown in the third state (i.e., FIG. 6C) following the second state, the feature game may be presented before, during, or after the other presentation sequences of the other outcome states and/or other game outcomes. In one example, the feature game is initiated prior to other outcome state sequences to use all of the value-bearing trigger symbols. In another example, the feature game may be presented concurrent to the base game feature such that the base game feature may continue (i.e., more game outcomes are generated and presented) concurrently with the feature game outcomes.

With respect to FIG. 6C, the feature game is initiated with the enhancement referenced by the feature indicia of the second persistent element 414. In the illustrated embodiment, the value-bearing symbols (which may include value-bearing symbols that are not trigger symbols) are held within the symbol array 410 and all non-value-bearing symbols are removed. In other embodiments, the non-value-bearing symbols may remain in the array 410. In such embodiments, the non-value-bearing symbols may be presented in an inactive state (e.g., greyed out or otherwise distinguished from the active value-bearing symbols). In certain embodiments, other symbols, such as modification symbols, may be held within the array 410 and/or non-value-bearing symbols may be converted into value-bearing symbols. For example, winning combinations of symbols may be converted into value-bearing symbols.

Without any game enhancement, the feature game is initiated with any trigger symbols associated with the second outcome state (i.e., the second trigger symbol 420) held in the array 410. The first and third trigger symbols 416, 422 are removed from the array through the other outcome states prior to the feature game in the example embodiment. In other embodiments, particularly those in which the other outcome state sequences are presented following the feature game, the trigger symbols 416, 422 may be present in the array 410 for the feature game.

The game enhancement associated with the second persistent element 414, as indicated by the feature indicia, includes providing more coins (i.e., value-bearing symbols) in the array 410 at the start or conclusion of the feature game. In the illustrated embodiment, additional value-bearing symbols 426 are randomly added to the array 410 at empty symbol positions. The number and/or value of the additional value-bearing symbols 426 may be random, partially random, or based on one or more game events or game conditions. In one example, the number of value-bearing symbols 426 and the value of each symbol 426 is randomly selected from a range or set of available values. In another example, the value of each additional value-bearing symbol 426 is a fixed, predetermined value. In a further example, the number of additional value-bearing symbols 426 is at least partially based on the number of trigger events associated with the second persistent element 414 that resulted in the second outcome state being selected.

Within the feature game, the interface 400 further includes a spin counter 428 that visually indicates the remaining duration of the feature game. In the illustrated embodiment, the feature game has a duration of five free spins. Other suitable durations (e.g., three or ten spins) may be applied and/or based on one or more random determinations, game events, and/or game conditions. In addition to or in place of the spin counter 428, other counters configured to monitor a time duration or other game events may be used to visually indicate the duration of the feature game. In one example, in place of a spin counter 428, a timer (e.g., for one, three, or five minutes) may be used to define the feature game duration. In at least some embodiments, the duration of the feature game is predefined and static (e.g., every instance of the feature game is initiated with five free spins). In other embodiments, the duration is dynamic. That is, the duration is initiated at a variable initial value and/or the duration may be extended through one or more random determinations, game events, and/or game conditions.

In the example embodiment, for each free spin, the game-logic circuitry is configured to determine a feature game outcome and cause the presentation assembly to present the feature game outcome. The feature game outcome may be generated using the same reels or sets of available symbols from the base game feature or different sets of available symbols. The non-value-bearing symbols may remain presented as blanks. Any value-bearing symbols detected within the feature game outcome is held within the symbol array 410, and the spins counter 428 is updated to indicate the current remaining duration. At the conclusion of the feature game duration, the award values of the value-bearing symbols held in the array 410 are aggregated together and provided as an aggregated award. For embodiments including modification symbols (e.g., multipliers), the modifications may be applied to the aggregated award or a portion of the value-bearing symbols. In certain embodiments, the modifications are not limited to affecting the award values and/or may include modifications that are applied to at least the subsequent base game outcome following the conclusion of the feature game. In one example, the modification symbols include an accumulator symbol that accumulates one or more held value-bearing symbols from the array 410 such that the accumulated symbols are removed, thereby opening more symbol positions to be occupied by additional value-bearing symbols. The presentation assembly is configured to present an award sequence for the aggregated award including one or more animations and/or presentation elements.

Although not present in the illustrated third state, the first and third persistent elements 412, 416 include feature indicia visually indicating other potential game enhancements for the feature game. More specifically, the first persistent element 412 provides an additional free spin (e.g., six free spins instead of five) for the feature game, and the third persistent element 416 multiplies the value of one or more value-bearing symbols (or the aggregated award value). Other suitable enhancements, such as adding additional value to the value-bearing symbols, duplicating value-bearing symbols to fill any unoccupied symbol positions, updating the award value of any held value-bearing symbol below a particular value, and the like may be provided in addition to or in place of the illustrated enhancements. In one example, additional persistent elements may be used to provide the other enhancements. In another example, the enhancement of the persistent elements 412, 414, and 416 may change throughout the game.

In certain embodiments, within the feature game, the additional trigger events may be detected. That is, the game may be configured to facilitate nested trigger events. In such embodiments, the first and third outcome states may function the same as described in the second state shown in FIG. 6B. The second outcome state may result in the feature game being extended and/or enhanced, another instance of the feature game initiated, or a different type of feature game is initiated. In some embodiments, the second outcome state may not be available within a nested trigger event. In certain embodiments, the feature game may be extended through other suitable game events, such as the presence of a predefined symbol or combination of symbols with the feature game outcomes.

Although the foregoing systems and methods describe the use of three persistent elements, it is to be understood that at least some embodiments may include additional, fewer, or alternative persistent elements, such as one example embodiment in which a single persistent element is present. In certain embodiments, the persistent elements may be selectively activated, where active persistent elements operate as described above and inactive persistent elements are not available for outcome state selection (i.e., a trigger event associated with an inactive persistent element is ignored). The inactive persistent elements may be visually distinctive from active persistent elements to enable players to readily distinguish between the two states of persistent elements. The persistent elements may switch between active and inactive states randomly, partially randomly, in response to one or more game events or conditions, expiration of an active or inactive duration, and/or the like.

Embodiments of the present invention realize benefits in increased computer processing efficiency with minimized processing overhead, fewer rules to be evaluated, fewer player inputs to be monitored, and simpler graphical representations. With respect to the game feature triggering process, if no trigger symbol appears in the array during a base game outcome, the game-logic circuitry foregoes any random determination of whether a game feature will be awarded. Furthermore, in at least some embodiments, if any trigger symbols do appear in the array, regardless of the number of persistent elements and associated game features that may be won in parallel, only a single invocation of the RNG (i.e., selection of the second outcome state for one trigger event) is required to determine whether any game feature will actually be triggered. In contrast, in typical prior art systems with mystery bonus triggers, the game-logic circuitry makes a random determination in each and every wagering game cycle and for each and every game feature that may be won, thereby reducing processing efficiency compared to the method presented herein.

Embodiments of the present invention comprise an innovative application of data processing steps that, when implemented by game-logic circuitry, direct a presentation assembly to present a symbol-value collection, modification, and award process that minimizes processing overhead by utilizing numbered indicia to represent credit values instead of complex, fanciful game images. Further, the process collects and awards displayed values borne by special symbols (i.e., value-bearing symbols) according to stored, variable criteria. In this way, the value-bearing symbols provide building blocks for innumerable different collection, modification, and award sequences simply by manipulating the criteria associated with the value-bearing symbols and award elements, resulting in fewer rules needed for the award process than would be necessary for calculating values of winning symbol combinations enumerated in stored paytables, as found in prior art reel-spinning routines. At the same time, embodiments of the present invention provide a straightforward, what-you-see-is-what-you-get (WYSIWYG) visual presentation that is simple to understand and, therefore, effective in generating player excitement and enthusiasm. The result is a highly flexible value-award process that can be easily adapted to any theme/brand while remaining easily understood by players.

With respect to the game feature itself, as value-bearing and/or modification symbols land and are held in the bonus game array, the game-logic circuitry need only respin those reels associated with any remaining vacant positions in the array. This minimizes the contribution of reels spins to processing overhead. And because the game-logic circuitry needs only to evaluate the bonus game array to aggregate visually indicated award values, the computing resources for conducting the game feature itself are minimized. In stark contrast, in typical free spin bonuses, overlapping payline sections require multiple evaluation steps. Often, analysis is required to determine which payline results in the highest credit total, with the lesser value paylines being discarded but only after being evaluated-all this adds to processing overhead. All these procedures can be inherently more complex than the bonus game embodiments disclosed herein. The embodiments disclosed herein involve simple collection of awards from value-bearing symbols over a duration of the game feature and an award sequence for the aggregated award is provided. This represents a win-win: simpler, almost self-explanatory graphics combined with faster, more efficient processing.

In this description, numerous specific details are set forth. However, it is understood that embodiments of the invention may be practiced without these specific details. In other instances, well-known circuits, structures and techniques have not been shown in detail in order not to obscure the understanding of this description. Note that in this description, references to "one embodiment" or "an embodiment" mean that the feature being referred to is included in at least one embodiment of the invention. Further, separate references to "one embodiment" in this description do not necessarily refer to the same embodiment; however, neither are such embodiments mutually exclusive, unless so stated and except as will be readily apparent to those of ordinary skill in the art. Thus, the present invention can include any variety of combinations and/or integrations of the embodiments described herein. Each claim, as may be amended, constitutes an embodiment of the invention, incorporated by reference into the detailed description. Moreover, in this description, the phrase "exemplary embodiment" means that the embodiment being referred to serves as an example or illustration.

Block diagrams illustrate exemplary embodiments of the invention. Flow diagrams illustrate operations of the exemplary embodiments of the invention. The operations of the flow diagrams are described with reference to the example embodiments shown in the block diagrams. However, it should be understood that the operations of the flow diagrams could be performed by embodiments of the invention other than those discussed with reference to the block diagrams, and embodiments discussed with references to the block diagrams could perform operations different than those discussed with reference to the flow diagrams. Additionally, some embodiments may not perform all the operations shown in a flow diagram. Moreover, it should be understood that although the flow diagrams depict serial operations, certain embodiments could perform certain of those operations in parallel or in a different sequence.

Each of these embodiments and obvious variations thereof is contemplated as falling within the spirit and scope of the claimed invention, which is set forth in the following claims. Moreover, the present concepts expressly include any and all combinations and subcombinations of the preceding elements and aspects.

What is claimed is:

1. A gaming system comprising:

a gaming machine comprising a presentation assembly configured to present a plurality of symbol positions and one or more persistent elements, each of the one or more persistent elements associated with a respective one or more bonus game features; and game-logic circuitry in communication with the presentation assembly, the game-logic circuitry configured to:

cause the presentation assembly to present one or more game outcomes by populating the plurality of symbol positions with a respective set of randomly selected symbols for each of the one or more game outcomes;

in response to detecting a catalyst event including detecting a feature-triggering symbol within the respective set of randomly selected symbols for any of the one or more game outcomes:

cause the presentation assembly to animate an addition of the feature-triggering symbol to a first persistent element of the one or more persistent elements;

randomly select an outcome state of the catalyst event from a plurality of outcome states, the plurality of outcome states including a first state associated with the one or more bonus game features linked to the first persistent element and a second state associated with an award value visually indicated by award indicia of the feature-trigger symbol;

in response to selecting the first state, cause the presentation assembly to present one or more bonus game outcomes based on the one or more bonus game features linked to the first persistent element; and in response to selecting the second state, cause the presentation assembly to present an award sequence for an award including the award value visually indicated by the award indicia of the feature-trigger symbol.

2. The gaming system of claim 1, wherein the plurality of outcome states further includes a third state, and wherein, in response to selecting the third state, the presentation assembly is configured to animate the first persistent element to change in visual appearance in response to the addition of the feature-triggering symbol.

3. The gaming system of claim 2, wherein the third state is unassociated with a bonus game feature or an award sequence.

4. The gaming system of claim 1, wherein the one or more bonus game features of the first persistent element comprises at least one of additional free game outcomes, additional value-bearing symbols including respective award indicia, additional symbol positions added to the plurality of symbol positions, increasing award values associated with one or more symbols, applying one or more modifiers to an available award or an award of an award sequence, changing a set of available symbols for populating the plurality of symbols, or activating additional or alternative award determinations for the one or more bonus game outcomes.

5. The gaming system of claim 1, wherein the one or more bonus game outcomes include presenting an award sequence for at least a portion of any value-bearing symbols occupying the plurality of symbol positions, each of the value-bearing symbols including award indicia visually indicating a respective award value.

6. The gaming system of claim 1, wherein the presentation assembly is configured to animate a reveal of the award indicia associated with the feature-triggering symbol in response to selecting the second state.

7. The gaming system of claim 1, wherein each of the one or more persistent elements is associated with a respective type of feature-trigger symbol indicated by one or more shared visual characteristics, and wherein a first type of the feature-triggering symbol is associated with the first persistent element.

8. The gaming system of claim 1, wherein the gaming machine further comprises a value input device configured to accept a physical item associated with a monetary value to establish a credit balance and a value output device configured to provide a payout from the credit balance in response to a cash out input.

9. A method of operating a gaming machine of a gaming system, the method comprising:

presenting, via a presentation assembly of the gaming machine, a plurality of symbol positions and one or more persistent elements, each of the one or more persistent elements associated with a respective one or more bonus game features;

causing, by game-logic circuitry of the gaming system, the presentation assembly to present one or more game outcomes by populating the plurality of symbol positions with a respective set of randomly selected symbols for each of the one or more game outcomes;

in response to detecting, by the game-logic circuitry, a catalyst event including detecting a feature-triggering symbol within the respective set of randomly selected symbols for any of the one or more game outcomes:

causing, by the game-logic circuitry, the presentation assembly to animate an addition of the feature-triggering symbol to a first persistent element of the one or more persistent elements;

randomly selecting, by the game-logic circuitry, an outcome state of the catalyst event from a plurality of outcome states, the plurality of outcome states including a first state associated with the one or more bonus game features linked to the first persistent element and a second state associated with an award value visually indicated by award indicia of the feature-trigger symbol;

in response to selecting the first state, causing, by the game-logic circuitry, the presentation assembly to present one or more bonus game outcomes based on the one or more bonus game features linked to the first persistent element; and in response to selecting the second state, causing, by the game-logic circuitry, the presentation assembly to present an award sequence for an award including the award value visually indicated by the award indicia of the feature-trigger symbol.

10. The method of claim 9, wherein the plurality of outcome states further includes a third state, and wherein, in response to selecting the third state, the presentation assembly is configured to animate the first persistent element to change in visual appearance in response to the addition of the feature-triggering symbol.

11. The method of claim 10, wherein the third state is unassociated with a bonus game feature or an award sequence.

12. The method of claim 9, wherein the one or more bonus game features of the first persistent element comprises at least one of additional free game outcomes, additional value-bearing symbols including respective award indicia, additional symbol positions added to the plurality of symbol positions, increasing award values associated with one or more symbols, applying one or more modifiers to an available award or an award of an award sequence, changing a set of available symbols for populating the plurality of symbols, or activating additional or alternative award determinations for the one or more bonus game outcomes.

13. The method of claim 9, wherein the one or more bonus game outcomes include presenting, via the presentation assembly, an award sequence for at least a portion of any value-bearing symbols occupying the plurality of symbol positions, each of the value-bearing symbols including award indicia visually indicating a respective award value.

14. The method of claim 9 further comprising animating, by the presentation assembly, a reveal of the award indicia associated with the feature-triggering symbol in response to selecting the second state.

15. The method of claim 9, wherein each of the one or more persistent elements is associated with a respective type of feature-trigger symbol indicated by one or more shared visual characteristics, and wherein a first type of the feature-triggering symbol is associated with the first persistent element.

16. The method of claim 9 further comprises:

accepting, via a value input device of the gaming machine, a physical item associated with a monetary value to establish a credit balance; and providing, via a value output device of the gaming machine, a payout from the credit balance in response to a cash out input.

17. A gaming machine comprising:

a presentation assembly configured to present a plurality of symbol positions and one or more persistent elements, each of the one or more persistent elements associated with a respective one or more bonus game features; and game-logic circuitry in communication with the presentation assembly, the game-logic circuitry configured to:

cause the presentation assembly to present one or more game outcomes by populating the plurality of symbol positions with a respective set of randomly selected symbols for each of the one or more game outcomes;

in response to detecting a catalyst event including detecting a feature-triggering symbol within the respective set of randomly selected symbols for any of the one or more game outcomes:

cause the presentation assembly to animate an addition of the feature-triggering symbol to a first persistent element of the one or more persistent elements;

randomly select an outcome state of the catalyst event from a plurality of outcome states, the plurality of outcome states including a first state associated with the one or more bonus game features linked to the first persistent element and a second state associated with an award value visually indicated by award indicia of the feature-trigger symbol;

in response to selecting the first state, cause the presentation assembly to present one or more bonus game outcomes based on the one or more bonus game features linked to the first persistent element; and in response to selecting the second state, cause the presentation assembly to present an award sequence for an award including the award value visually indicated by the award indicia of the feature-trigger symbol.

18. The gaming machine of claim 17, wherein the plurality of outcome states further includes a third state, and wherein, in response to selecting the third state, the presentation assembly is configured to animate the first persistent element to change in visual appearance in response to the addition of the feature-triggering symbol.

19. The gaming machine of claim 18, wherein the third state is unassociated with a bonus game feature or an award sequence.

20. The gaming machine of claim 17, wherein the one or more bonus game features of the first persistent element comprises at least one of additional free game outcomes, additional value-bearing symbols including respective award indicia, additional symbol positions added to the plurality of symbol positions, increasing award values associated with one or more symbols, applying one or more modifiers to an available award or an award of an award sequence, changing a set of available symbols for populating the plurality of symbols, or activating additional or alternative award determinations for the one or more bonus game outcomes.

21. The gaming machine of claim 17, wherein the one or more bonus game outcomes include presenting an award sequence for at least a portion of any value-bearing symbols occupying the plurality of symbol positions, each of the value-bearing symbols including award indicia visually indicating a respective award value.

22. The gaming machine of claim 17, wherein the presentation assembly is configured to animate a reveal of the award indicia associated with the feature-triggering symbol in response to selecting the second state.

23. The gaming machine of claim 17, wherein each of the one or more persistent elements is associated with a respective type of feature-trigger symbol indicated by one or more shared visual characteristics, and wherein a first type of the feature-triggering symbol is associated with the first persistent element.

* * * * *